(12) United States Patent
Chen et al.

(10) Patent No.: US 8,964,703 B2
(45) Date of Patent: Feb. 24, 2015

(54) SUB-BAND DEPENDENT RESOURCE MANAGEMENT

(75) Inventors: Wanshi Chen, San Diego, CA (US); Xiaoxia Zhang, San Diego, CA (US); Durga Prasad Malladi, San Diego, CA (US); Xiliang Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1194 days.

(21) Appl. No.: 12/443,978

(22) PCT Filed: Nov. 1, 2007

(86) PCT No.: PCT/US2007/083393
§ 371 (c)(1),
(2), (4) Date: Jul. 2, 2009

(87) PCT Pub. No.: WO2008/057971
PCT Pub. Date: May 15, 2008

(65) Prior Publication Data
US 2010/0027502 A1    Feb. 4, 2010

Related U.S. Application Data

(60) Provisional application No. 60/863,889, filed on Nov. 1, 2006, provisional application No. 60/864,579, filed on Nov. 6, 2006.

(51) Int. Cl.
*H04W 4/00*       (2009.01)
*H04B 7/216*      (2006.01)
(Continued)

(52) U.S. Cl.
CPC .............. *H04W 52/34* (2013.01); *H04L 5/0007* (2013.01); *H04L 5/0037* (2013.01); *H04L 5/0092* (2013.01); *H04W 52/248* (2013.01); *H04W 72/0486* (2013.01)
USPC ............ 370/335; 370/328; 370/329; 370/330

(58) Field of Classification Search
None
See application file for complete search history.

(56) References Cited

U.S. PATENT DOCUMENTS 6,493,331 B1    12/2002  Walton et al.
7,136,654 B1 *  11/2006  Hogberg et al. .............. 455/450
(Continued)

FOREIGN PATENT DOCUMENTS

AU    2007317375 B2    11/2010
CN       1484906 A      3/2004
(Continued)

OTHER PUBLICATIONS

Partial International Search Report—PCT/US07/083393, European Patent Office—Dec. 12, 2008.
(Continued)

*Primary Examiner* — John Blanton
*Assistant Examiner* — Diane Lo
(74) *Attorney, Agent, or Firm* — Dalei Dong

(57) ABSTRACT

A system and method for facilitating resource management in OFDM systems is provided. The system permits different and flexible resource cell metric operations levels (e.g. uplink load management, admission control, congestion control, signal handoff control) for different sub-bands. For the uplink load management, there are multiple distinct load operation points (e.g. IoT, RoT) per sub-band group instead of the same operation level across the entire available band. The sub-band groups encompass the entire band. The facilitation system also comprises a variety of transmitting protocols, command increment variable stepsize methods and robust command response methods. The system thus provides more flexible reverse link resource management and more efficient utilization of the bandwidth.

34 Claims, 22 Drawing Sheets

(51) Int. Cl.
  *H04W 52/34* (2009.01)
  *H04L 5/00* (2006.01)
  *H04W 52/24* (2009.01)
  *H04W 72/04* (2009.01)

(56) References Cited

U.S. PATENT DOCUMENTS

| | | | |
|---|---|---|---|
| 8,571,132 B2 | 10/2013 | Khandekar et al. | |
| 2002/0082032 A1 | 6/2002 | Hunzinger | |
| 2004/0228283 A1 | 11/2004 | Naguib | |
| 2005/0037771 A1* | 2/2005 | Tiedemann et al. | 455/453 |
| 2005/0053036 A1 | 3/2005 | Takeda | |
| 2005/0094607 A1 | 5/2005 | Zaki et al. | |
| 2005/0096061 A1* | 5/2005 | Ji et al. | 455/450 |
| 2007/0019589 A1* | 1/2007 | Attar et al. | 370/335 |
| 2008/0039129 A1* | 2/2008 | Li et al. | 455/522 |
| 2008/0081564 A1* | 4/2008 | Rao | 455/63.1 |
| 2013/0195062 A1 | 8/2013 | Li et al. | |

FOREIGN PATENT DOCUMENTS

| | | |
|---|---|---|
| JP | 2002539732 A | 11/2002 |
| KR | 20040004462 | 1/2004 |
| RU | 2285349 C2 | 10/2006 |
| WO | WO-0056099 A1 | 9/2000 |
| WO | 0249305 | 6/2002 |
| WO | WO03001741 A1 | 1/2003 |
| WO | WO-2004114716 A1 | 12/2004 |
| WO | WO-2005020613 A2 | 3/2005 |
| WO | 2006004968 | 1/2006 |
| WO | WO-2006062994 A2 | 6/2006 |
| WO | WO-2006069401 | 6/2006 |
| WO | 2006099547 | 9/2006 |

OTHER PUBLICATIONS

International Search Report and Written Opinion, PCT/US2007/083393, European Patent Office, Dec. 12, 2008.
Taiwan Search Report—TW096141262—TIPO—Feb. 20, 2012.

* cited by examiner

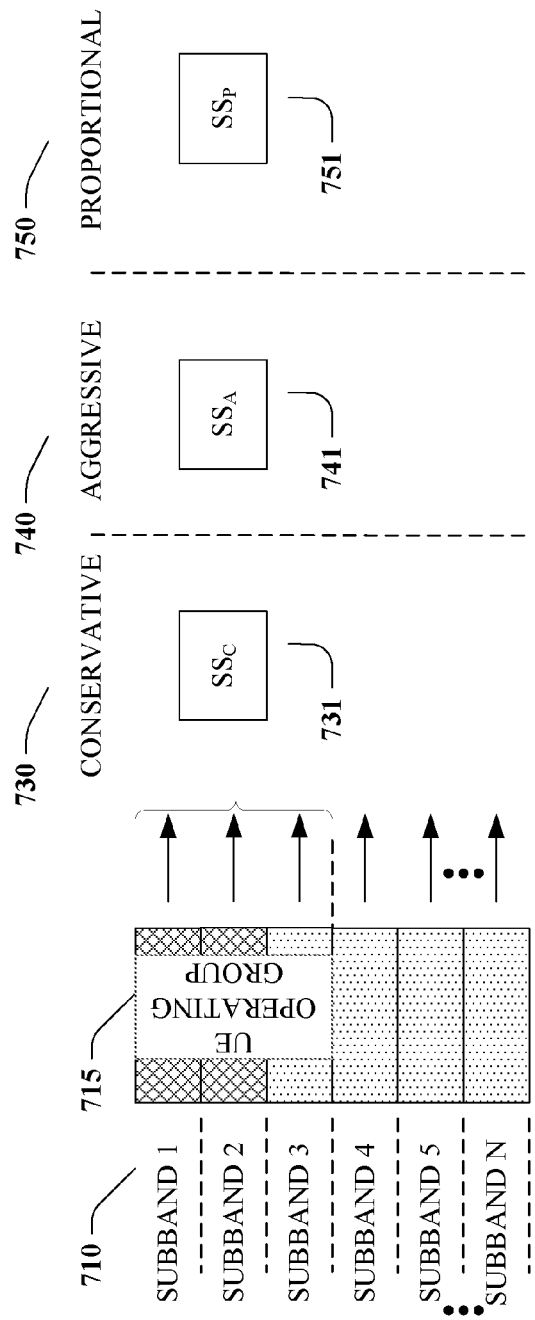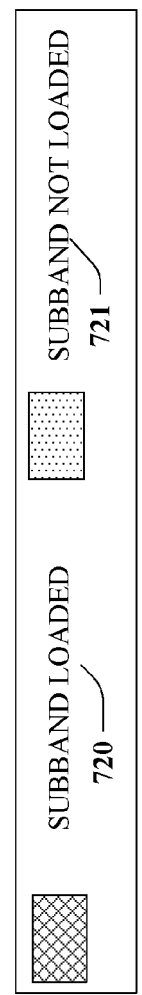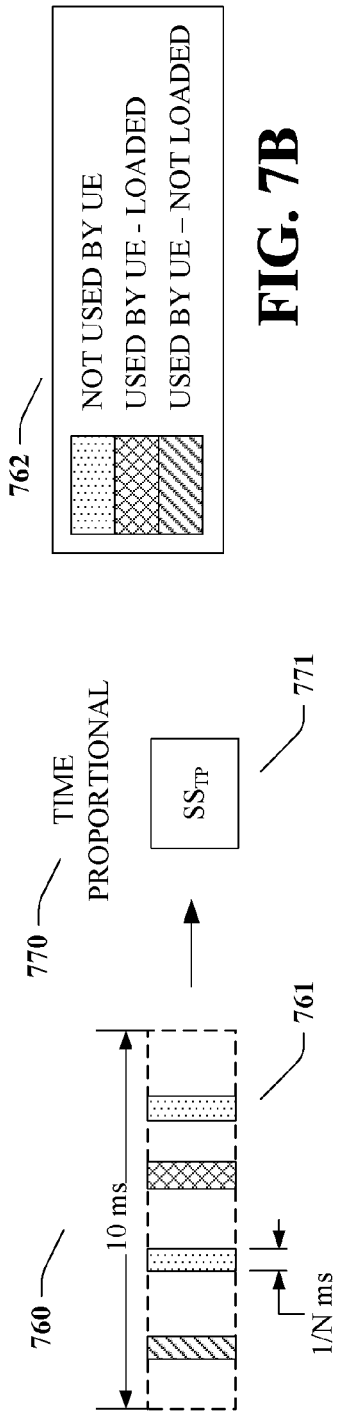
FIG. 7A
FIG. 7B

SUB-BAND DEPENDENT RESOURCE MANAGEMENT

CROSS-REFERENCE TO RELATED APPLICATIONS

This application claims the benefit of U.S. Provisional Patent Application Ser. No. 60/863,889 entitled "SUB-BAND DEPENDENT UPLINK LOAD MANAGEMENT" which was filed Nov. 1, 2006, and U.S. Provisional Patent application Ser. No. 60/864,579 entitled "A METHOD AND APPARATUS FOR SUB-BAND DEPENDENT LOAD CONTROL OPERATIONS FOR UPLINK COMMUNICATIONS" which was filed Nov. 6, 2006. The entirety of the aforementioned application is herein incorporated by reference.

BACKGROUND

I. Field

The following description relates generally to wireless communications, and more particularly to resource management in a wireless communication system.

II. Background

A wireless communication network (e.g., employing frequency, time and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within coverage area of the base station can be interested in receiving one, more than one, or all data streams carried by the composite stream. Likewise, a mobile terminal can transmit data to the base station, other stations or other mobile terminals. Each terminal communicates with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Conventional technologies utilized for transmitting information within a mobile communication network (e.g., a cell phone network) include frequency, time and code division based techniques. In general, with frequency division based techniques calls are split based on a frequency access method, wherein respective calls are placed on a separate frequency. With time division based techniques, respective calls are assigned a certain portion of time on a designated frequency. With code division based techniques respective calls are associated with unique codes and spread over available frequencies. Respective technologies can accommodate multiple accesses by one or more users.

With time division based techniques, a band is split timewise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

More particularly, frequency division based techniques typically separate the spectrum into distinct channels by splitting it into uniform chunks of bandwidth, for example, division of the frequency band allocated for wireless cellular telephone communication can be split into 30 channels, each of which can carry a voice conversation or, with digital service, carry digital data. Each channel can be assigned to only one user at a time.

One commonly utilized variant is an orthogonal frequency division technique that effectively partitions the overall system bandwidth into multiple orthogonal sub-bands. Orthogonal meaning that the frequencies are chosen so that cross-talk between the sub-channels is eliminated and inter-carrier guard bands are not required. These sub-bands are also referred to as tones, carriers, subcarriers, bins, and frequency channels. Each sub-carrier is modulated with a conventional modulation scheme (such as quadrature amplitude modulation) at a low symbol rate. Orthogonal frequency division has an advantageous ability to cope with severe channel conditions—for example, attenuation of high frequencies at a long copper wire, narrowband interference and frequency-selective fading due to multipath—without complex equalization filters. Low symbol rate makes the use of a guard interval between symbols affordable, making it possible to handle time-spreading and eliminate inter-symbol interference (ISI).

The orthogonality also allows high spectral efficiency, near the Nyquist rate. Almost the whole available frequency band can be utilized. OFDM generally has a nearly 'white' spectrum, giving it benign electromagnetic interference properties with respect to other co-channel users, and allowing higher transmit power when a single cell is considered alone. Also, without interior-carrier guard bands, the design of both the transmitter and the receiver is greatly simplified; unlike conventional FDM, a separate filter for each sub-channel is not required.

Orthogonality is often paired with frequency reuse, where communications taking place in cells located far apart may use the same portion of the spectrum, and ideally the large distance prevents interference. Cell communications taking place in nearby cells use different channels to minimize the chances of interference. Over a large pattern of cells, a frequency spectrum is reused as much as possible by distributing common channels over the entire pattern so that only far apart cells reuse the same spectrum. In such a case, and when scheduler flexibility to allocate bandwidth to different users is introduced, inter-cell interference control becomes critical. Sub-band scheduling and diversity techniques can be accordingly developed. In addition, different sub-bands may have different frequency reuse factors such that fractional frequency reuse (FFR) can be adopted to improve cell coverage and cell edge user performance.

An aspect disclosed herein is that in FDMA systems, the assigned bandwidths may be divided into sub-bands and that the efficient management of resources in a wireless communication system is completed though the use of flexible and variable threshold settings per sub-band.

In conventional thought, a single control level is assigned to a band. This one control level does not serve the variety of conditions that may exist in a cell well and must be set at a typical lowest common limiting factor such that all User Equipment (UE) can communicate with the base station. Variability by level of use, by type of signals, by time constraints, by location, type and number of UE in a given cell and by proximity to other cells in a multi cell network may all contribute to an increased need for efficient use of resources.

For uplink communications, it is desirable to control reverse link load. Conventionally, a single control is typically employed for time-frequency bands; however, doing so results in a relatively inflexible framework. By dividing a communications band into several sub-bands increased flexibility is achieved as to conventional schemes—this affords for increased control granularity by having different control thresholds over respective sub-bands as well as allowing for distinct control per sub-band. The increase in control provides for using sub-bands for different purposes, and more efficient usage of reverse up-link resources as compared to conventional schemes.

More particularly, interference management in orthogonal systems is facilitated by identifying and mitigating caused by neighboring cells. Communications bandwidth is divided into multiple sub-bands, and load indicator(s) are provided per sub-band. As noted supra, doing so mitigates inter-cell interference, improves control granularity, and facilitates overall utilization of system resources. The load per sub-band information is provided as binary load indicator data and is provided for both a serving cell and broadcast to neighboring cells. The user equipment (UE) has access to both the serving cell and non-serving neighbor cell's load indicator data on a per sub-band basis, which provides for a level of granularity that allows for more complete use of the bandwidth, and more UE's can operate at load within a given bandwidth.

As cell phone use and amount of data sent continues to expand, it may be appreciated from the foregoing discussion, the efficient use of bandwidth resources, specifically the uplink load operating level requirements for control and data traffic management, is an issue that requires consideration in connection with wireless communications.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

Market forces have moved the industry toward simple communications protocols in an attempt to optimize system performance. The aspects described and claimed herein run counter to conventional wisdom and market forces by increasing processing overhead via partition of bandwidth into multiple sub-bands. The sub-bands further are not constrained to be associated with cell metric operation levels that are constant across the sub-bands. Generally, this can be noted as follows:

$$CellChar_{th}(1) \underset{flexible}{= \text{ or } \neq} CellChar_{th}(2) \underset{flexible}{= \text{ or } \neq} \ldots \underset{flexible}{= \text{ or } \neq} CellChar_{th}(N)$$

The utilization of multiple sub-bands and control thereof incurs a perceived processing load for data tracking and optimization. However, as a result of enduring such perceived processing load, overall system performance optimization is facilitated as a result of the flexibility afforded by more granular control of sub-bands and increased utilization of system resources.

For example, in conventional systems with single control every user within a given cell can increase power which can result in interference to neighboring cells. In response, UE in neighboring cells would likely respond by increasing their power to overcome the interference which in turn would cause interference in the other cell. Consequently, such convergence toward power boosting compounds interference created.

As another example, uplink load is maintained at a certain level for a controlled overshoot percentage such that control traffic can be reliably received by base stations. The same level is maintained across the entire available band. The uplink load metric can be in the form of, e.g., interference over thermal (IoT) or rise over thermal (RoT). The IoT operating level is typically limited by the control traffic from cell edge users. Control traffic is often transmitted with channel-independent rates. Advanced mechanisms such as H-ARQ may not be applicable to control traffic as well. On the other hand, cell edge users generally experience severe channel impairments and more likely become power limited. These factors contribute to an often low IoT operation point, e.g., around 5 dB. However, users with good channel conditions are less likely to be power-limited and capable of supporting a much higher IoT point. The inflexible and low IoT operation level thus makes the uplink load management for data traffic unnecessarily inefficient.

An embodiment of the disclosed resource management allows flexible uplink load operating levels in different sub-bands, instead of the same operation level across the entire available band. With improved management of sub-band dependent uplink load, control information can still be reliably received by base stations, even for cell edge users, while data traffic can enjoy higher and flexible uplink load levels. Subsequently, larger per user throughput and sector throughput (not shown) can be achieved. Flexible and efficient uplink link management mechanism can exploit different control and data traffic characteristics, channel condition dynamics among users, sub-band operations, and different frequency reuses.

We allow different and flexible control operation levels for different sub-bands. Viewing IoT as a non-limiting example, suppose there are N sub-bands and denote the target operation levels as $IoT_{th}(n)$ for sub-band $n=1, \ldots, N$, instead of choosing $IoT_{th}(1)=IoT_{th}(2)=\ldots=IoT_{th}(N)$ as in the conventional control uplink load management, we propose to have $$IoT_{th}(1) \underset{flexible}{= \text{ or } \neq} IoT_{th}(2) \underset{flexible}{= \text{ or } \neq} \ldots \underset{flexible}{= \text{ or } \neq} IoT_{th}(N)$$

It is to be appreciated that the proposal is not just limited to load control information propagation over the air. Instead, the idea is also applicable to other resource managements (e.g. admission control, congestion control). For convenience sake, the idea is discussed in detail in regards to load control information. The configuration of sub-band dependent load control, the generation and propagation of sub-band dependent load control information, and the processing of load control information at terminals are discussed in details.

In an aspect, a method that facilitates cell resource management, comprising permitting different and flexible cell metric operation levels for different sub-band groups. Sub-bands are comprised of dividing the bandwidth into N sub-bands where N is an integer greater than or equal to one. Sub-band groups are equal to M number of sub-bands where M is an integer from 1 to N. Sub-band groups are composed of sub-bands with the same or similar operational characteristics. The method further comprises varying transmission of the control commands as a function of bits allocated over an air interface for control or transmitting one sub-band group control over air at a time and cycle through the entire sub-band groups over time. In this method the control commands are variable in nature and vary according to indices of UE's in the cell, sub-bands in the cell; and fractional frequency reuse factor, if present.

In a particular aspect of the above method, the cell metric operation is uplink load control operation. The uplink load metric may be one of IoT or RoT. The method comprises varying transmission of the load control commands as a function of bits allocated over an air interface for load control or transmitting one sub-band group load control over air at a time and cycle through the entire sub-band groups over time. In this method the load control commands are variable in nature and vary according to indices of UE's in the cell, sub-bands in the cell; and fractional frequency reuse factor, if present.

In other particular aspects of the above method, the cell metric operation is at least one of admission control, congestion control and signal handoff control.

In a further aspect, a method of responding to different and flexible sub-band commands such that user equipment reacts differently for commands of different sub-band groups. The reaction may be at least one of a conservative response, an aggressive response, a proportional response or a time proportional response.

In an aspect, a computer readable medium that has stored thereon computer executable code for facilitating cell resource management, comprising permitting different and flexible cell metric operation levels for different sub-band groups. Sub-bands are comprised of dividing the bandwidth into N sub-bands where N is an integer greater than or equal to one. Sub-band groups are equal to M number of sub-bands where M is an integer from 1 to N. Sub-band groups are composed of sub-bands with the same or similar operational characteristics. The computer readable medium further comprises code that when executed causes varying transmission of the control commands as a function of bits allocated over an air interface for control or transmitting one sub-band group control over air at a time and cycle through the entire sub-band groups over time. In this computer readable medium the code permits control commands to be variable in nature and vary according to indices of UE's in the cell, sub-bands in the cell; and fractional frequency reuse factor, if present.

In a particular aspect of the above computer readable medium, the cell metric operation is uplink load control operation. The uplink load metric may be one of IoT or RoT. The code when executed causes varying transmission of the load control commands as a function of bits allocated over an air interface for load control or transmitting one sub-band group load control over air at a time and cycle through the entire sub-band groups over time. In this computer readable medium the code when executed permits load control commands to be variable in nature and vary according to indices of UE's in the cell, sub-bands in the cell; and fractional frequency reuse factor, if present.

In other particular aspects of the above computer readable medium, the cell metric operation is at least one of admission control, congestion control and signal handoff control.

In a further aspect, a computer readable medium that has stored thereon computer executable code for responding to different and flexible sub-band commands such that user equipment reacts differently for commands of different sub-band groups. The reaction may be at least one of a conservative response, an aggressive response, a proportional response or a time proportional response.

In an aspect, a apparatus comprising a storage medium that stores thereon computer executable code for facilitating cell resource management, comprising permitting different and flexible cell metric operation levels for different sub-band groups, and a processor that executes the stored code. Sub-bands are comprised of dividing the bandwidth into N sub-bands where N is an integer greater than or equal to one. Sub-band groups are equal to M number of sub-bands where M is an integer from 1 to N. Sub-band groups are composed of sub-bands with the same or similar operational characteristics. The apparatus storage medium further stores code that when executed causes varying transmission of the control commands as a function of bits allocated over an air interface for control or transmitting one sub-band group control over air at a time and cycle through the entire sub-band groups over time. In this apparatus storage medium, the code permits control commands to be variable in nature and vary according to indices of UE's in the cell, sub-bands in the cell; and fractional frequency reuse factor, if present.

In a particular aspect of the above apparatus, the cell metric operation is uplink load control operation. The uplink load metric may be one of IoT or RoT. The code when executed causes varying transmission of the load control commands as a function of bits allocated over an air interface for load control or transmitting one sub-band group load control over air at a time and cycle through the entire sub-band groups over time. In this apparatus storage medium, the code when executed permits load control commands to be variable in nature and vary according to indices of UE's in the cell, sub-bands in the cell; and fractional frequency reuse factor, if present.

In other particular aspects of the above apparatus, the cell metric operation is at least one of admission control, congestion control and signal handoff control.

In a further aspect, a apparatus comprising a storage medium that stores thereon computer executable code for responding to different and flexible sub-band commands such that user equipment reacts differently for commands of different sub-band groups. The reaction may be at least one of a conservative response, an aggressive response, a proportional response or a time proportional response. The apparatus also comprises a processor that executes the stored code.

In yet another aspect, a system for facilitating cell resource management comprises means for permitting different and flexible cell metric operation levels for different sub-band groups. Sub-band groups are composed of sub-bands with the same or similar operational characteristics. The system further comprises means for varying transmission of the control commands as a function of bits allocated over an air interface for control or transmitting one sub-band group control over air at a time and cycle through the entire sub-band groups over time. The system further comprises means for causing control commands to be variable in nature and vary according to indices of UE's in the cell, sub-bands in the cell; and fractional frequency reuse factor, if present.

In a particular aspect of the above system, means for the cell metric operation to be uplink load control operation. The uplink load metric may be one of IoT or RoT. The system comprises means for varying transmission of the load control commands as a function of bits allocated over an air interface for load control or transmitting one sub-band group load control over air at a time and cycle through the entire sub-band groups over time. The system comprises means for causing load control commands to be variable in nature and vary according to indices of UE's in the cell, sub-bands in the cell; and fractional frequency reuse factor, if present.

In other particular aspects of the above system, means for the cell metric operation to be at least one of admission control, congestion control and signal handoff control.

In a further aspect, a system for responding to different and flexible sub-band commands comprises means for user equipment to react differently for commands of different sub-band groups. The mean for reaction may be at least one of a conservative response, an aggressive response, a proportional response or a time proportional response.

In an aspect, a method to mitigate inter-cell interference gains granularity and increased efficiency by dividing communications bandwidth into multiple sub-bands and providing a load indicator per sub-band. The load per sub-band information is provided as binary load indicator data and is provided for both a serving cell and broadcast to neighboring cells. A user equipment (UE) has access to both the serving cell and non-serving neighbor cell's load indicator data on a per sub-band basis, which provides for a level of granularity that allows for more complete use of the bandwidth, and more UE's can operate at load within a given bandwidth.

In another aspect a method to control and reduce inter-cell interference through UE based load management is disclosed. The method robustly handles multiple cells that operate either synchronously or asynchronously, and allows an individual UE capability to be a factor in optimizing the reduction of inter-cell interference. When a UE is started, it typically receives a message from the serving cell access node indicating the type of serving cell operation (e.g., synchronous or asynchronous). The type of operation can force the UE to follow one method or another in reducing inter-cell interference. The current method allows the UE to seek the best method of inter-cell interference reduction that may not be dependent on the serving cell's mode of operation. In one non-limiting example, an UE may be operating in a asynchronous cell but have the capability of accessing a neighbor cell's load data directly. In this case, the UE may operate to reduce or maintain its transmitting power spectral density depending on a faster direct neighbor cell binary load per sub-band information rather than waiting for the neighbor cell binary load per sub-band information that may arrive through a backhaul channel of the serving cell.

In an aspect, a method that facilitates inter-cell interference mitigation, comprises: dividing a cell bandwidth into N sub-bands, where N is an integer >2; assigning the respective sub-bands to respective user equipment (UEs); tracking sub-band assignments; and broadcasting sub-band assignments to neighboring cells.

In another aspect, a computer readable storage medium has stored thereon computer readable instructions for performing acts comprising: dividing a cell bandwidth into N sub-bands, where N is an integer >2; assigning the respective sub-bands to respective user equipment (UEs); tracking sub-band assignments; and broadcast sub-band assignments to neighboring cells.

In yet another aspect, an apparatus, comprise: a storage medium, comprising computer executable instructions stored thereon for carrying out the following acts: dividing a cell bandwidth into N sub-bands, where N is an integer >2; assigning the respective sub-bands to respective user equipment (UEs); tracking sub-band assignments; and broadcasting sub-band assignments to neighboring cells. A processor executes the computer executable instructions.

In an aspect, a system that facilitates inter-cell interference mitigation, comprises: means for dividing a cell bandwidth into N sub-bands, where N is an integer >2; means for assigning the respective sub-bands to respective user equipment (UEs); means for tracking sub-band assignments; and means for broadcasting sub-band assignments to neighboring cells.

In another aspect, a method that facilitates inter-cell interference mitigation, comprises: receiving an assigned sub-band; identifying capabilities of a user equipment (UE); if the UE meets a capability threshold, look at neighboring cells for conflicting sub-band load indicator data; if a conflict exists, reduce UE power; and if a conflict does not exist, maintain UE power.

In yet another aspect, a computer readable storage medium has stored thereon computer readable instructions for performing acts comprising: receiving an assigned sub-band; identifying capabilities of a user equipment (UE); if the UE meets a capability threshold, look at neighboring cells for conflicting sub-band load indicator data; if a conflict exists, reduce UE power; and if a conflict does not exist, maintain UE power.

In still yet another aspect, an apparatus, comprises: a storage medium, comprising computer executable instructions stored thereon for carrying out the following acts: receiving an assigned sub-band; identifying capabilities of a user equipment (UE); if the UE meets a capability threshold, look at neighboring cells for conflicting sub-band load indicator data; if a conflict exists, reduce UE power; and if a conflict does not exist, maintain UE power. A processor executes the computer executable instructions.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIGS. 7A and 7B illustrate load control stepsize modification approaches in accordance with various aspects set forth herein.

DETAILED DESCRIPTION

Figure 1:
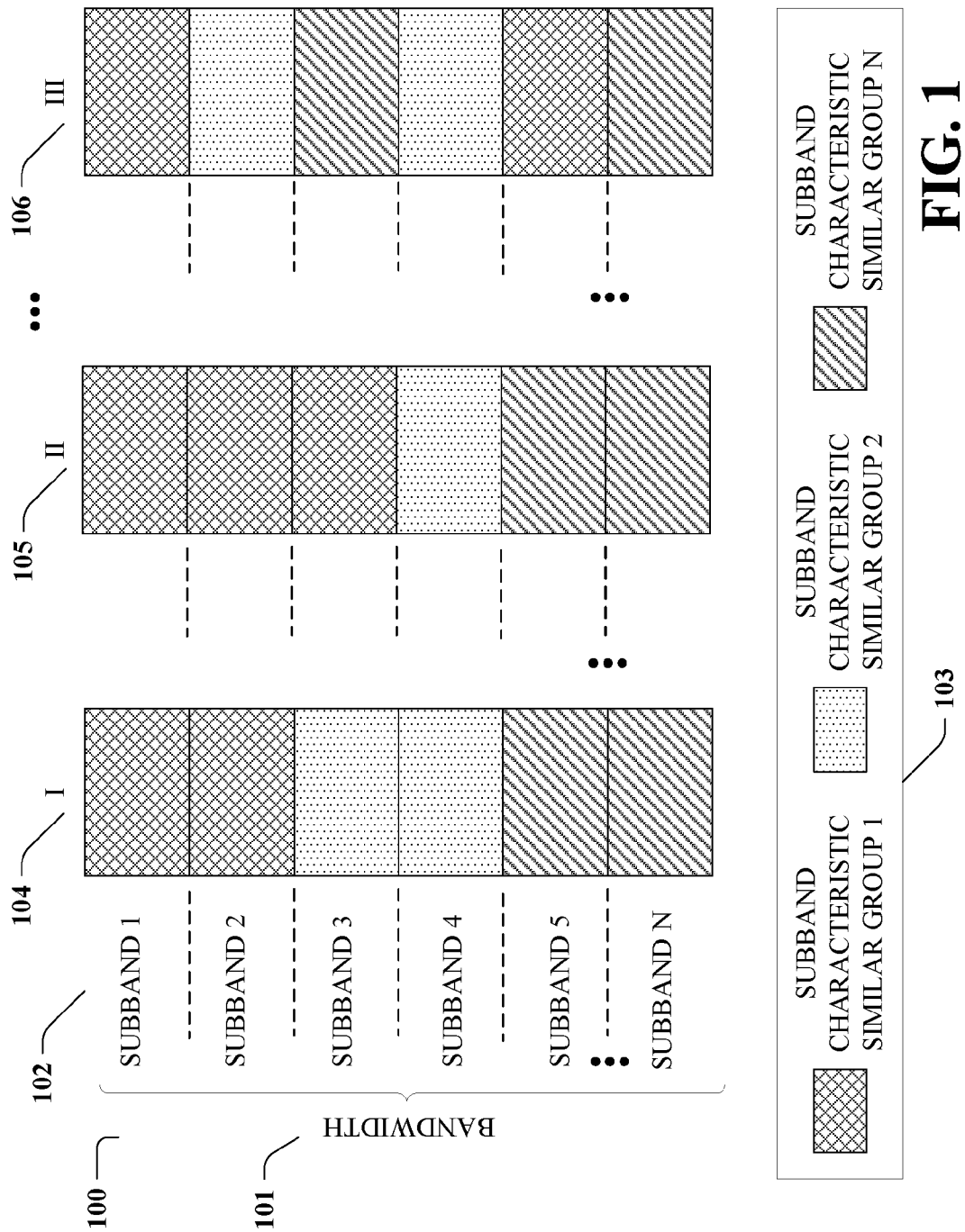
FIG. 1 is an illustration of a wireless communication system in accordance with various aspects set forth herein.

The claimed subject matter is now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments. As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (access point or access terminal) is receiving and processing data received on a given channel.

Various aspects can incorporate inference schemes and/or techniques in connection with transitioning communication resources. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events, or decision theoretic, building upon probabilistic inference, and considering display actions of highest expected utility, in the context of uncertainty in user goals and intentions. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, various aspects are described herein in connection with a subscriber station. A subscriber station can also be called a system, a subscriber unit, mobile station, mobile, remote station, access point, remote terminal, access terminal, user terminal, user agent, a user device, mobile device, portable communications device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

FIG. 1 displays a number of exemplary examples of cell metrics being associated with a divided bandwidth methodology 100. Market forces have moved the industry toward simple communications protocols in an attempt to optimize system performance. The aspects described and claimed herein run counter to conventional wisdom and market forces by increasing processing overhead via partition of bandwidth into multiple sub-bands. The sub-bands further are not constrained to be associated with cell metric operation levels that are constant across the sub-bands. Generally, this can be noted as follows:

$$CellChar_{th}(1) \underset{flexible}{= \text{ or } \neq} CellChar_{th}(2) \underset{flexible}{= \text{ or } \neq} \ldots \underset{flexible}{= \text{ or } \neq} CellChar_{th}(N)$$

The utilization of multiple sub-bands and control thereof incurs a perceived processing load for data tracking and optimization. However, as a result of enduring such perceived processing load, overall system performance optimization is facilitated as a result of the flexibility afforded by more granular control of sub-bands and increased utilization of system resources. For example, in conventional systems with single control every user within a given cell can increase power which can result in interference to neighboring cells. In response, UE in neighboring cells would likely respond by increasing their power to overcome the interference which in turn would cause interference in the other cell. Consequently, such convergence toward power boosting compounds interference created.

In an aspect, a telecommunication system's access node (e.g. cell, base station) communicates with other nodes including end nodes (e.g. User Equipment (UE)) through a given bandwidth 101. The bandwidth is divided into a number of sub-bands N, where N is an integer 102. The sub-bands can be logically referred to in groups of similar sub-band characteristics. The number of different characteristics 103 is not constrained. Generation of cell operation metrics can be performed on a per sub-band group basis. For each sub-band group, the operational metric at the base station is averaged over the entire set of sub-bands of the given group, and compared against the group-specific target characteristic to generate system commands. Exemplary example 104 portrays three sub-band groups, each of size 2. In this example, each of the sub-bands are equal in size and are located next to each other in bandwidth order. An aspect of flexibility is portrayed 105, wherein the number of sub-bands belonging to any particular group can be sized to be n sub-bands, from n=1 to n=N sub-bands where N=total number of available sub-bands. Sub-band group 1 contains three sub-bands, sub-band group 2 contains a single sub-band and sub-band group N contains the remaining sub-bands. Additional flexibility can be seen in 106, in that the requirement of similar characteristics need not be applied to contiguous sub-bands. Sub-band group 1 contains sub-bands 1 and 5 while sub-band group 2 contains sub-bands 2 and 4.

Figure 2:
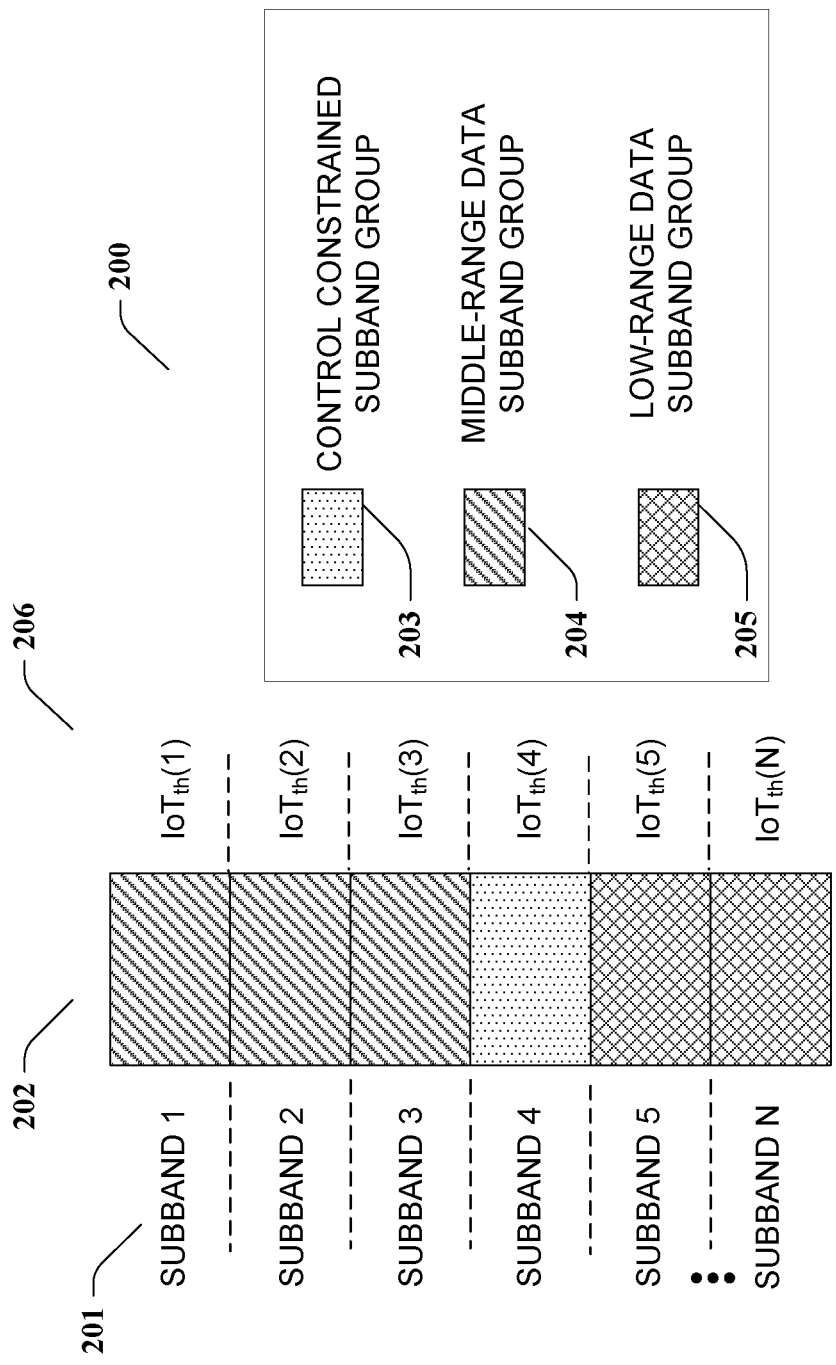
FIG. 2 is an exemplary illustration of a variable and flexible load control operational characteristic in accordance with various aspects set forth herein.

Referring now to FIG. 2, an aspect of the variable and flexible cell metric operational characteristic is disclosed. Controlling power load conditions of UE's in a cellular network is a primary and vital aspect of service quality. In a non-limiting example, the power control method utilizing IoT 200 is discussed. In this aspect, we define sub-band group as a set of sub-bands with similar or the same IoT operation levels, such that they can be treated the same from the uplink load management perspective. The number of sub-bands 201 are associated with the control metric per sub-band 206. The value of the metric 202 is of the three values listed 203, 204 and 205. In general terms, each sub-band has a target IoT operation level denoted as IoTth(n) for sub-bands n=1, . . . , N; and these target levels are permitted to be different and flexible as follows:

$$IoT_{th}(1) \underset{flexible}{= \text{ or } \neq} IoT_{th}(2) \underset{flexible}{= \text{ or } \neq} \ldots \underset{flexible}{= \text{ or } \neq} IoT_{th}(N)$$

There are two type of traffic exchanged between nodes, control 203 and data 204, 205 traffic. Since control traffic transmission typically is not channel-adaptive, the IoT operating level has to be maintained at a relatively low level. An aspect of the present invention is to designate one or more sub-bands as control-traffic constrained sub-bands 203. The IoT operating level is typically limited by control traffic from cell edge users. Cell edge users generally experience severe channel impairments and more likely become power limited. As well as power limitations, error rates may increase and advanced error control mechanisms such as H-ARQ may not be as applicable to control traffic as well as data. Control traffic is often transmitted with channel-independent rates. These factors contribute to an often low IoT operation point, e.g., around 5 dB. Thus the uplink load metric (e.g. the IoT operating level) is typically limited by control traffic from cell edge users.

However, users with good channel conditions are less likely to be power-limited and capable of supporting a much higher IoT point. The inflexible and low IoT operation level from the cell edge thus makes the uplink load management for data traffic unnecessarily inefficient.

Non-control-constrained sub-bands (called D-sub-bands) can be further divided into multiple groups 204, 205. In an embodiment, D-sub-bands are divided into two categories, one is called middle-range intended for users with medium geometries, and the other is called low-range intended for users with large geometries and close to the serving sector. Typically, we have: $IoT_{th}$ (D Sub-bands, Low Range)>$IoT_{th}$ (D Sub-bands, Mid Range)>$IoT_{th}$ (C Sub-bands). Here the allowed variability presents the option of having a higher control limit for Low Range D Sub-bands which can be assigned to UE's closer to the center of the serving cell. In this location UE's are more likely to be able to handle higher loads without unwanted effects such as inter-cell interference.

It is to be appreciated that control traffic can be scheduled on some of the D-sub-bands as well as data traffic on some of the control constrained sub-band group if the base station's scheduler has information about the user's channel conditions such that reliable control information transmission can be achieved.

Figure 3:
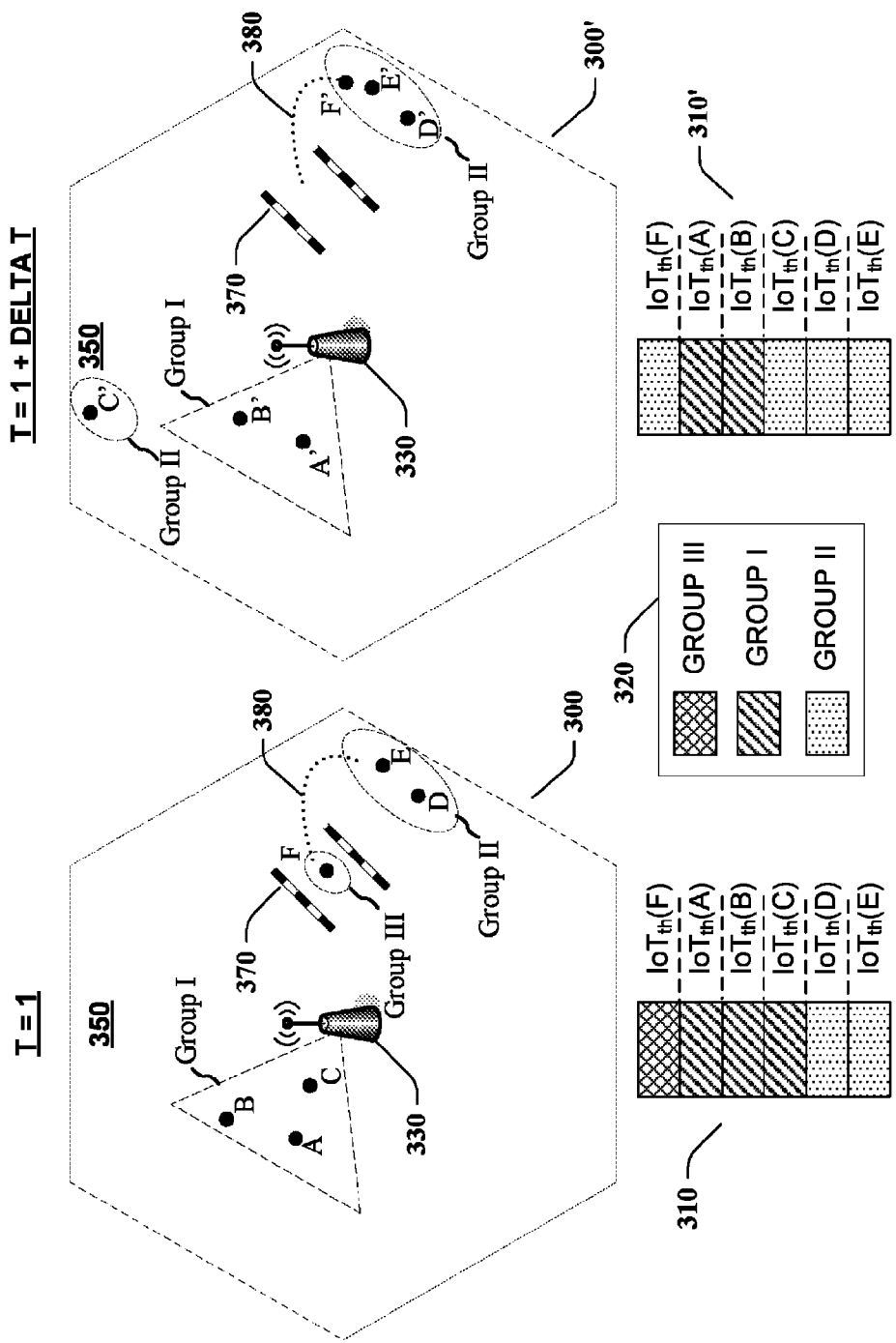
FIG. 3 is an illustration of further variable and flexible load control operational characteristics in accordance with various aspects set forth herein.

Referring now to FIG. 3, it is also to be appreciated that the configuration of sub-band groups can be dynamically changed over time and adapt to system conditions, and can be different for different sectors (not shown) of a controlling serving cell as designated by the cell area 350 or by the base station 330. At a time T=1, the state of a cell is shown 300. The bandwidth for the cell has been divided into sub-bands 310. The UE are denoted as A, B, C, D, E and F. In this aspect, the cell metric is load control, IoT, and the load control per bandwidth is captured in similar characteristic groups I, II and III 320. Group III is comprised of single UE F which is undergoing passage through an urban canyon as denoted by 370 on path 380. It should be appreciated that passage through an urban canyon necessitates a high power level and corresponding IoTth(F). Group I is composed of UE A, B and C. This group is operating under close proximity to the serving cell base station 330. As noted supra, UE in this condition may enjoy a higher power level without introducing inter-cell interference to UE in adjacent neighbor cells (not shown). Group II composed of UE D and E share the same or similar IoT level for UE near a cell edge. Typically, this IoT level will be lower in power.

At Time=1+Delta T, the state of the cell 350 has changed to 300'. UE F' has completed its path 390 out of the urban canyon 370 just as UE C' indicates a change in location from UE C. Both UE C' and UE F' changes entail a change in cell operational characteristics. UE A' and UE B' also indicate movement, but without a corresponding change in characteristics, while UE d" and UE E' have remained stationary with no change in the noted characteristic. With these changes, the Subband Group composition has changed. Group I now is composed only of UE A' and UE B'. These UE still enjoy the ability to operate at high power and high IoT without adverse system effects. Group II is now composed of UE C', D', E', and F'. It should be noted that while C' is not located in the same area as D', E' and F', the operating characteristics are the same or similar. Group III has been eliminated as there are no UE with demand for such a high level of IoT at state 300'. This elimination does not waste any bandwidth as the control sub-band groups remain flexible. With these changes, the sub-bands 310' indicate the adaptation to system conditions that the sub-band groups have undertaken.

Figure 4:
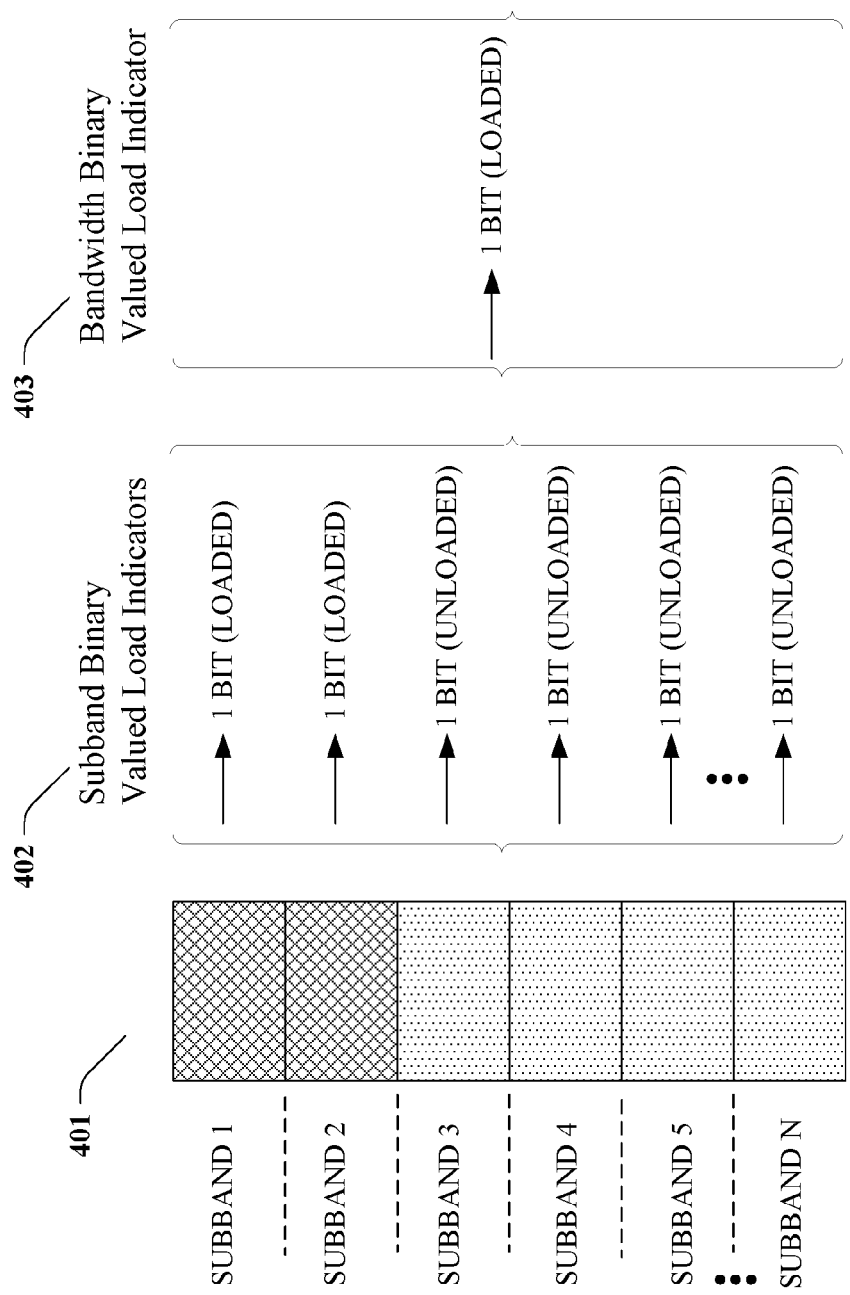
FIG. 4 is an exemplary illustration of sub-band binary load indicators and bandwidth binary load indicators.
Figure 4:
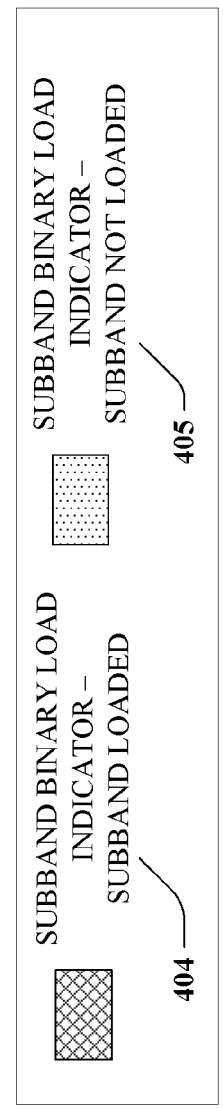

FIG. 4 provides an illustration of an aspect of the current invention. As pictured, a given bandwidth comprises a number of sub-bands 401 (e.g. sub-bands 1 to N). Each sub-band then provides a binary valued load indicator 402 showing if that sub-band is in use 404 or is available for use 405 in a particular cell. The finer granularity can be seen when compared to the bandwidth binary valued load indicator as provided with sub-band division 403, where sub-bands 3 to N are actually available when sub-bands 1 and 2 are in use.

In orthogonal cellular systems, inter-cell interference needs to be mitigated to ensure cell-edge quality of service (QoS). Different systems employ different forms of techniques, but in essence there are two schools of thought. In a network based solution, each cell controls the transmit power spectral density (Tx PSD) of each UE based on its neighbor cell signal to noise ratio (SNR) measurements—this is similar to general packet radio service (GPRS). In a UE based solution, each UE controls its own Tx PSD based on neighbor cell SNR. Furthermore, in the UE based solution there are two aspects. In a neighbor cell based aspect, each UE monitors an uplink load indicator transmitted by a subset of the neighbor cells that it detects—similar to high-speed uplink packet access (HSUPA), LTE, and DOrC. In a serving cell aspect, the serving cell broadcasts uplink load of the geographical neighbor cells (e.g., used in flash). Aspects described herein employ a UE based uplink load management scheme that combines the above two solutions appropriately.

The UE based load management system disclosed can be handled across multiple cells that operate either synchronously or asynchronously. This allows an individual UE capability to be a factor in optimizing the reduction of inter-cell interference. When a UE is started, it typically receives a message from the serving cell access node indicating type of serving cell operation (e.g., synchronous or asynchronous). The type of operation can force the UE to follow one method or another in reducing inter-cell interference. The current method allows the UE to seek a best method of inter-cell interference reduction that may not be dependent on the serving cell's mode of operation. In one non-limiting example, an UE may be operating in a asynchronous cell but have the capability of accessing a neighbor cell's load data directly. In this case, the UE may operate to reduce or maintain its transmitting power spectral density depending on a faster direct neighbor cell binary load per sub-band information rather than waiting for the neighbor cell binary load per sub-band information that may arrive through a backhaul channel of the serving cell.

In the UE based approach, there are pros and cons of each solution. In the neighbor cell based aspect, the UE can detect neighbor cell load quickly. However, in asynchronous systems, the UE needs to maintain multiple fast fourier transform (FFT) timings, one for each neighbor cell detected—this can be a con. In the serving cell based aspect, the UE does not need to maintain any neighbor cell timing—this is advantageous. However, load information needs to propagate through a backhaul (con).

A hybrid approach (e.g., combining various features) results in improved performance. To combine, each cell broadcasts both parameters: uplink inter-cell interference seen at the receiver (Rx). A binary valued load indicator is employed per sub-band, and this indicates whether the respective cell is loaded on a particular sub-band or not. A sub-band is smaller than or equal to the total system bandwidth (e.g., 20 MHz system with 20 sub-bands of 900 KHz each and a spanned bandwidth of 18 MHz). The transmission is done on a primary broadcast channel (BCH). Regarding neighbor cell load, loading is done from geographically close cells, and load is indicated per sub-band.

With respect to UE behavior, the UE reduces Tx PSD depending on detected neighbor cell load. Detection is based on either of two approaches: (1) decoded load indicator transmitted from neighbor cell; and (2) decoded neighbor cell load information transmitted from serving cell. In synchronous systems, the UE relies on load indicators transmitted from neighbor cell. In asynchronous systems, the UE relies on neighbor cell load information transmitted from the serving cell.

In an alternative aspect, one could envision behavior in asynchronous systems dependent on UE capability (e.g., ability to maintain multiple Rx timing, Tx BW capability (10 MHz vs. 20 MHz, and peak data rate capability). The UE is aware whether the system is synchronous or not, and the information is transmitted as part of system parameters on BCH (broadcast channel).

The preceding discussion focused on dividing bandwidth into sub-bands for a given cell. It is to be understood that the disclosed aspects are not limited by this example and includes other applications such as dividing a cell into sectors and then dividing the sector bands into sub-bands.

Figure 5:
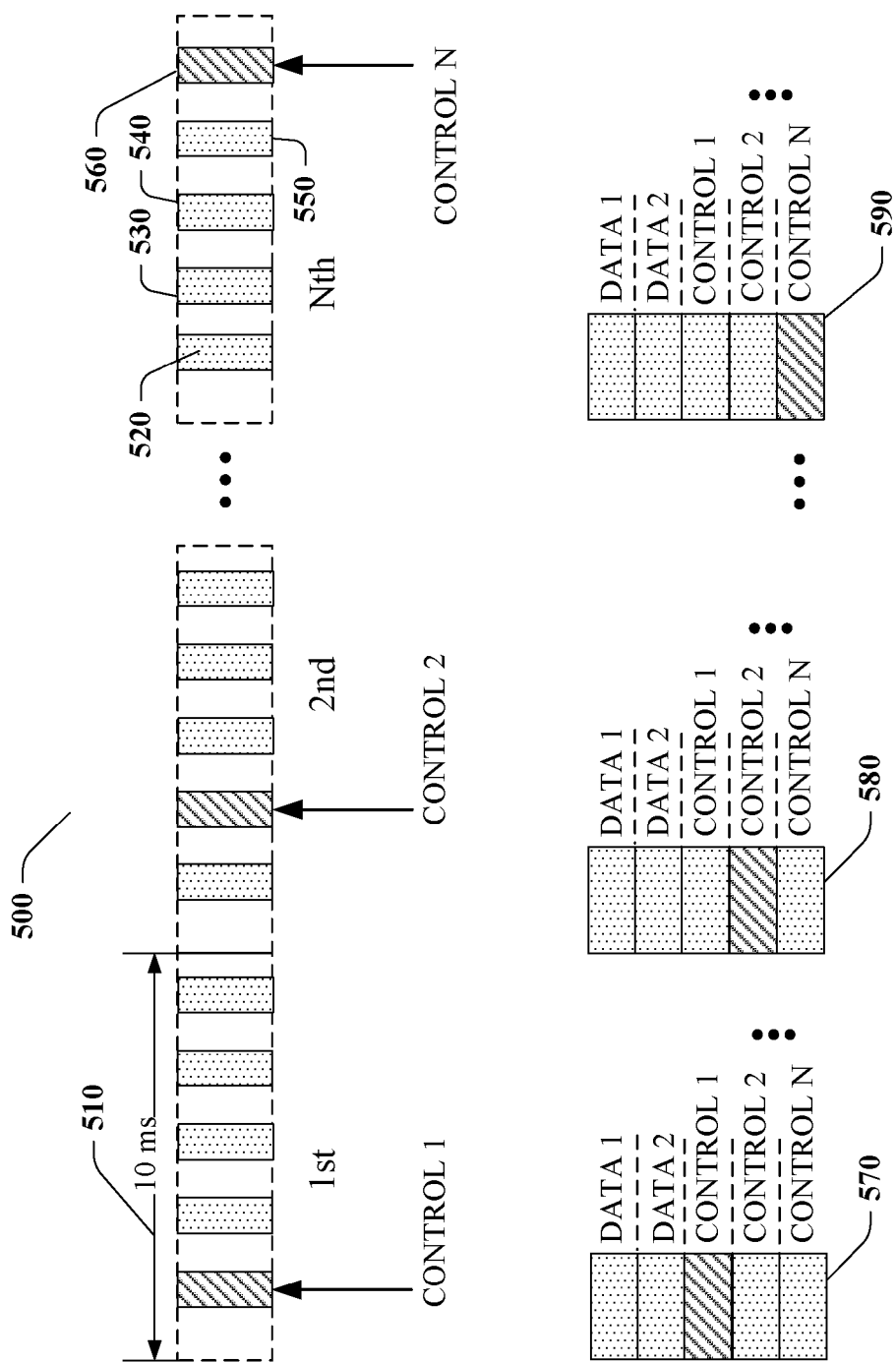
FIG. 5 is an exemplary illustration of transmission flexibility in accordance with various aspects set forth herein.

Yet another aspect is disclosed in FIG. 5. In an aspect, the transmission (and/or coding) of load control commands can be made to be dependent on the number of bits allocated over the air interface for load control, be it cycling through the entire bandwidth a sub-band at a time, a group at a time, a single bit at a time, a set of bits at a time or a combination thereof. In order to propagate the load control information for all sub-band groups, we can transmit one sub-band group load control over the air at a time and cycle through the entire sub-band groups over time.

This aspect 500 displays a typical time slice 510 of 10 ms. Within that time slice, the five sub-bands 520, 530, 540, 550 and 560 are provided a regular time slot for communication. The slot for the control constrained sub-bands are modified to increase the bandwidth for data. At state 570, Control 1 data is supplied at the proscribed sub-band and time slot. It should be noted that the sub-bands for Control 2 through Control N belong to the data sub-band group with different operational characteristics than the constrained control group. At state 580, Control 2 data is sent at the proscribed sub-band and the same time slot as the Control 1 data of state 450. In this case, the additional time slots corresponding to Control 1 and Control N are freed to carry data. This cycle continues through to state 590, where the Control N time slot carries the control N characteristic data and the time slots for all other control sub-bands are freed for additional data use. In this manner resources normally limited by the control constrained operational characteristics are more efficiently utilized with data in each time slice. Thus, this aspect operates such that C-sub-bands only appear in some specific time slots (non-contiguous in time), instead of in all slots, depending on the capacity requirement of the system (e.g. control traffic, idle operations of mobile stations) actually curtailing the limiting factor of control transmissions and have limited C-sub-bands-less operations. By controlling how often control bits are sent, it is possible to have less frequent uplink load control, compared with the conventional load control case, and open up resources for data traffic.

Or it can be envisioned in an aspect that other individual coding/joint coding options are also possible, e.g., or-of-down rule, or-of-up rule, more complicated combinations of sub-band group commands, as discussed in greater detail in FIG. 7.

Figure 6B:
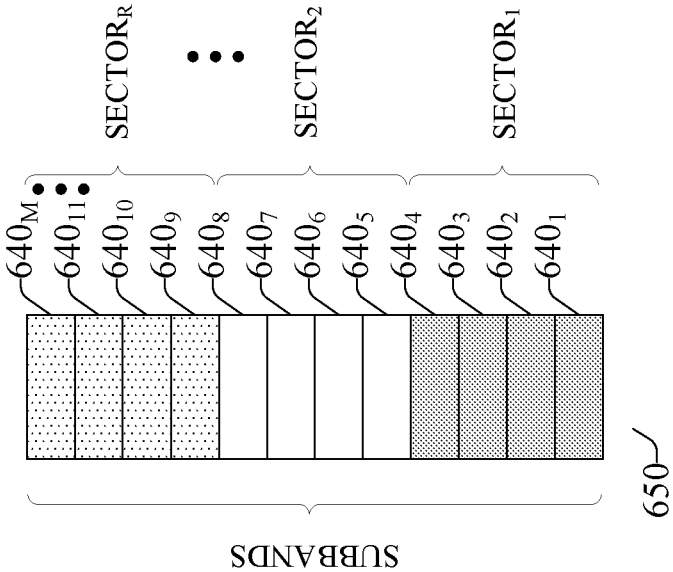
FIGS. 6A and 6B are exemplary illustrations of load control in accordance with various aspects set forth herein.
Figure 6A:
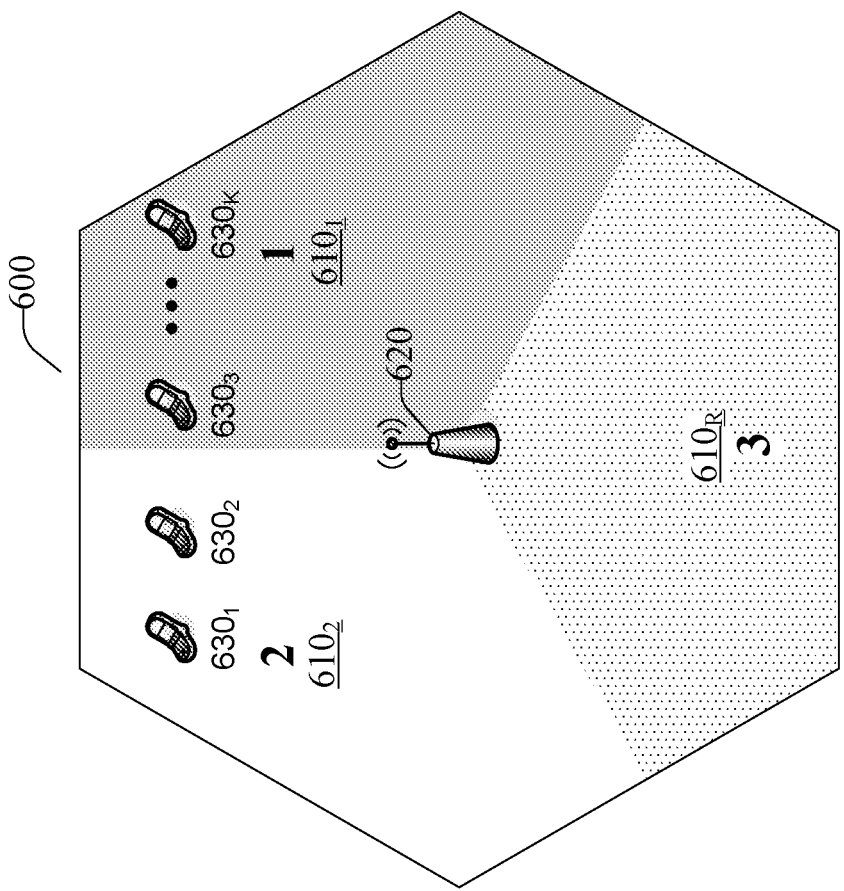

FIGS. 6A and 6B display another aspect of the current application. Generally speaking, the power spectral density (PSD) adjustment stepsizes (SS) at the terminals can be designed differently for different sub-band group commands, differently for different mobile stations (channel conditions) and/or differently for different cells, especially for different frequency reuse factors. That is, the stepsizes (e.g., for down, up or hold commands) can be denoted as $\Delta(K, M, R) \geq 0$ where K is the index of mobile stations, M is the index of sub-band groups and R is the frequency reuse index. The stepsizes could be zero for some combinations of K, M, and R.

In FIG. 6A, Cell 600, as controlled by base station 620 has been divided into sectors based on fractional frequency reuse. The sectors are noted as $610_1, 610_2, \ldots 610_R$. In the exemplary example, the reuse factor is 3 (R=3). A number of UE are shown in the cell and these are noted at $630n$ where n=an integer K. K is the total number of UE operating in the cell. It should be appreciated that K is most likely not a static number and changes over time. As presented, UE $630_1$ and $630_2$ reside in Sector 2, $610_2$ and UE $630_3$ through $630_K$ reside in Sector 1, $610_1$.

In FIG. 6B, the bandwidth for 620 is broken into sub-bands $640_1, 640_2$, through $640_M$. Sub-bands $640_1$ through $640_4$ are displayed as a sub-band group Sector$_1$. Sub-bands $640_5$ through $640_8$ are displayed as sub-band group Sector$_2$. Sub-bands $640_9$ through $640_M$ comprise sub-band group Sector$_R$. Similarly to the example UE's discussed in FIG. 3, individual UE's may have markedly different channel conditions even within the same sector. Furthermore, it may be envisioned that it would be desirable to be able to control UE's similarly within a given sector. As noted previously, control by individual sub-band is also an advantageous feature. In the current aspect, each of the UE, Sub-band and Sector conditions can contribute to the load control methodology by incorporating the system data, through indices of UE, Sub-band and Sector, into the step size of the control command from 620 to $630_1, 630_2, \ldots 630_K$. Thus, as a specific example, UE $630_1$ is using sub-bands $640_5$ and $640_6$. Specific load commands to increase or decrease power to UE $630_1$ can indicate an incremental power stepsize governed by SS$\Delta$ (1, 5-6, 2). This stepsize can be different from other stepsize commands issued by base station 620 to other UE (e.g. $630_3$ utilizing sub-band $640_3$, which would have a stepsize governed by SS$\Delta$ (3, 3, 1)). The stepsize for UE $630_1$ can also vary over time as the indices are updated with the change sin state for cell 600. In this manner, stepsize control can be fine tuned to a number of factors affording far greater precision in UE and system control.

FIGS. 7A and 7B describes aspects that are useful in regards to UE's handling the different and flexible cell metric operational levels for a variety of commands. In a non-limiting example, when the load control commands transmitted over the air are sub-band group dependent, it is desirable that the UE respond differently for different sub-band group commands. This is particularly true when UE occupies more than 1 sub-band and not all sub-bands are overloaded. Optimization of system parameters can dictate that the UE modify power control commands from the base station. In this aspect, the stepsizes of the commands are modified based on the approach taken. Allowing several approaches provides a robustness for fine tuning overall system performance.

In FIG. 7A, the bandwidth of the cell is associated with sub-bands 710 and load indicators 720 and 721. The UE is operating in sub-bands 1 and 2 which may span more than one sub-band group and thus receive more than one sub-band group load command. In the example portrayed, the sub-band groups are composed of n=1 sub-band. The variety of possible reactions for the UE regarding system command information can include at leas the following approaches:

A conservative approach 730 which would yield a stepsize response according to the presence of a Down command in any of the sub-bands which make up the UE operating group. That is, if a sub-band group power command from the base station (not pictured) indicates a power down direction for any of the sub-bands which make up UE operating group, the UE will step power down. This method is denoted $SS_C$ and can be summarized as "OR of DOWNs". In the exemplary example, the UE receiving the sub-band information 720 and 721 would react by powering down 731 by step size $SS_C$.

It is envisioned that an aggressive approach 740 may be of value in certain conditions. In this scenario, the UE is directed to increase power if any of the sub-bands in which it operates (e.g. sub-band 3) is not loaded. This method is denoted as $SS_A$ and can be summarized as "OR of Ups". In the exemplary example, the UE receiving the sub-band information 720 and 721 would react by powering up 741 by step size $SS_A$.

Proportional approaches 750 and 760, are also envisioned in which the step size for the command can be adjusted (e.g. proportional to bandwidth, proportional to time when sub-band is assigned). For instance, in a non-limiting example of 750, the step size adjustment 751 (denoted $SS_P$) is proportional to sub-band related system operating characteristics 720 and 721. Since 715 indicates 2 of the 3 sub-bands are loaded while the 3rd is not, the UE can modify the directed downward power spectral density step proportionally by ⅔, or $$PSD\ delta = (⅔)*NOM\_STEP\_SIZE.$$

FIG. 7B discloses one embodiment in which the UE response to load controls can be proportional to time 770 when sub-bands for the particular UE are assigned. In this method, the non-limiting exemplary example provides for a time frame of 10 ms 761 where the N number of sub-bands each are assigned a time window of 1/N ms. Within the 10 ms frame, four sub-bands are represented for this cell in the time slice, the UE uses sub-band-1 t1 (ms), uses sub-band-2 t2 (ms) and the UE does not transmit anything within the remaining 10-t1-t2 (ms), The two slices in use by the UE have the corresponding system characteristics of one slice loaded and one slice unloaded. The time proportional approach 770 then provides the UE with the PSD adjustment according to the following parameters: load indicator for sub-band-1 (true or false); load indicator for sub-band-2 (true or false); fraction of time for sub-band-1=$t^1/_{10}$; fraction of time for sub-band-2=$t^2/_{10}$. This is denoted by $SS_{TP}$.

Numerous such combinations of frequency/time or other potential factors can be applied and fall within the scope of the claims as presented.

Figure 8:
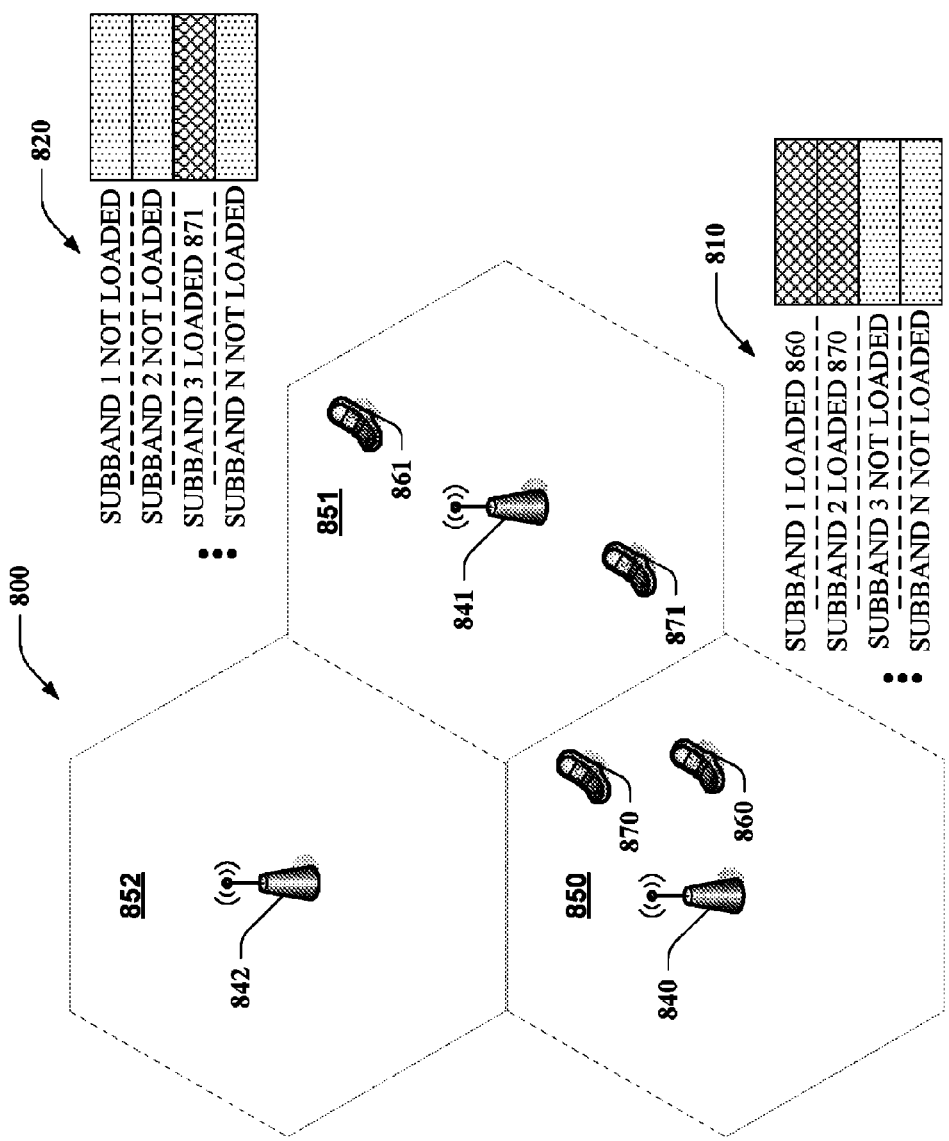
FIG. 8 is an illustration of an exemplary aspect of inter-cell interference that the present application controls.

Referring now to FIG. 8, an exemplary aspect of inter-cell interference mitigation is presented. In cell 850, end nodes 870 and 860 use sub-bands 1 and 2 as represented by the sub-band load indicator 890. For that same frequency band, also used in cell 851, the sub-band load indicator 891 illustrates which sub-band end node 871 is using. End node 861 is using a different frequency band altogether (not shown). Under these conditions, the concern for inter-cell interference would be critical in OFDM systems. In conventional controls, the load indicator as generated by 740 may not be obtainable to 741. In cases where the load indicator is shared between neighboring cells, the aspect of sub-bands increases granularity of the system. the increased granularity allows more efficient and denser use of the frequency sub-bands in the given frequency used in the different cells. In the illustrated exemplary example, the Power Spectral Density (PSD) for the end nodes 760, 770 and 771 can remain at their respective levels since there is no inter-cell interference. Had end node 771 been operating in sub-band 2, there would indeed be interference and the control commands from 741 to 771 and from 740 to 760 and 770 would be required. The sub-band load indicators illustrates that even though the end nodes are all in the same frequency band, there is no interference, thus no need to change power levels, allowing the UE's to operate efficiently without unnecessary reductions in transmit power.

Figure 9:
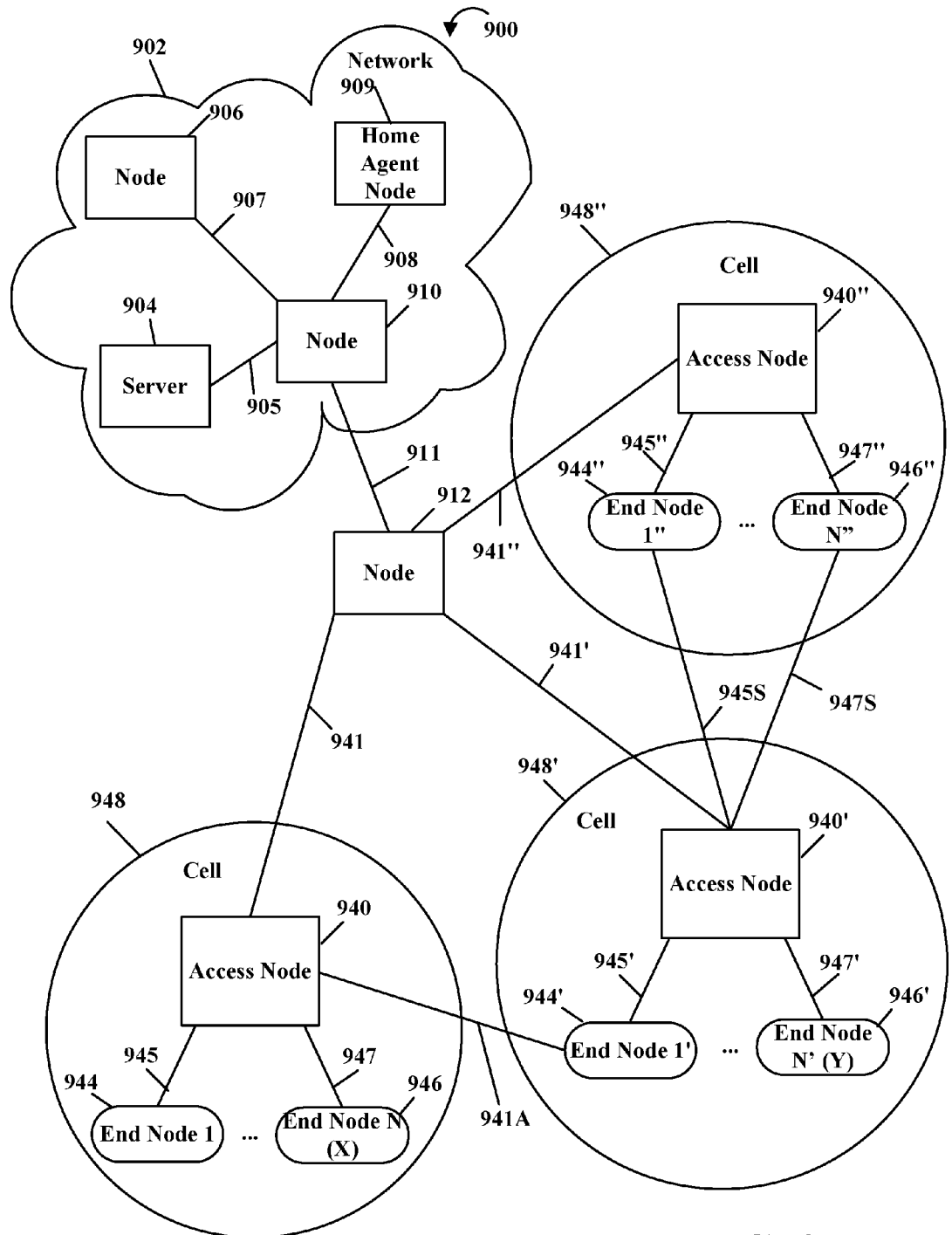
FIG. 9 is an illustration of an exemplary communication system (e.g., a cellular communication network) implemented in accordance with various aspects.

Referring now to FIG. 9, a wireless communication system 900 is illustrated in accordance with various embodiments presented herein. System 900 comprises a plurality of nodes interconnected by communications links 905, 907, 908, 911, 941, 941', 941", 941A, 945, 945', 945", 945S, 947, 947', 947" and 947S. Nodes in exemplary communication system 900 may exchange information using signals (e.g., messages) based on communication protocols (e.g., the Internet Protocol (IP)). The communications links of system 900 may be implemented, for example, using wires, fiber optic cables, and/or wireless communications techniques. Exemplary communication system 900 includes a plurality of end nodes 944, 946, 944', 946', 944", 946", which access communication system 900 via a plurality of access nodes 940, 940', and 940".

End nodes 944, 946, 944', 946', 944", 946" may be, for example, a cellular phone, a smart phone, a laptop, a handheld communication device, a handheld computing device, a satellite radio, a global positioning system, a PDA, and/or any other suitable device for communicating over wireless communication system 900. Also, end nodes 944-946 may be fixed or mobile.

Access nodes 940, 940', 940" can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Access nodes 940, 940', 940" may be, e.g., wireless access routers or base stations. Access node 940 may be a fixed station and/or mobile.

End nodes 944-946 may communicate with access node 940 (and/or disparate access node(s)) on a downlink and/or an uplink channel at any given moment. The downlink refers to the communication link from access node 940 to end nodes 944-946, and the uplink channel refers to the communication link from end nodes 944-946 to access node 940. Access node 940 may further communicate with other base station(s) and/or any disparate devices (e.g., server 904, nodes 906, 908 and 910) that may perform functions such as, for example, authentication and authorization of end nodes 944-946, accounting, billing, and so on.

Exemplary communication system 900 also includes a number of other nodes 904, 906, 909, 910, and 912, used to provide interconnectivity or to provide specific services or functions (e.g. backhaul path for serving and non-serving cell sub-band binary value load indicator data). Specifically, exemplary communication system 900 includes a Server 904 used to support transfer and storage of state pertaining to end nodes. The Server node 904 may be an AAA server, a Context Transfer Server, a server including both AAA server functionality and Context Transfer server functionality.

Exemplary communication system 900 depicts a network 902 that includes Server 904, node 906 and a home agent node 909, which are connected to an intermediate network node 910 by corresponding network links 905, 907 and 908, respectively. Intermediate network node 910 in network 902 also provides interconnectivity to network nodes that are external from the perspective of network 902 via network link 911. Network link 911 is connected to another intermediate network node 912, which provides further connectivity to a plurality of access nodes 940, 940', 940" via network links 941, 941', 941", respectively.

Each access node 940, 940', 940" is depicted as providing connectivity to a plurality of N end nodes (944, 946), (944', 946'), (944", 946"), respectively, via corresponding access links (945, 947), (945', 947'), (945", 947"), respectively. In synchronous systems, access links such as 945S and 947S may also be available. In synchronous or asynchronous systems, end nodes may have the capability of establishing access links to access nodes outside their own cell environments depicted by 941A. In exemplary communication system 900, each access node 940, 940', 940" is depicted as using wireless technology (e.g., wireless access links) to provide access. A radio coverage area (e.g., communications cells 948, 948', and 948") of each access node 940, 940', 940", respectively, is illustrated as a circle surrounding the corresponding access node.

An exemplary aspect of cell neighbors in a multi-cell network is presented. A cell as represented by its service area 948 may have neighbor cells 948' and 948". Equally, A cell may be represented by access node 940 and its neighbors 940' and 940". According to an aspect of the current invention, each cell broadcasts (e.g. on the BCH channel) the sub-band binary valued load indicator data for sub-bands 1 to N (binary data bits 1 to N for the frequency sub-bands in use in that cell). In addition to its own load indicator data, the cell through the backhaul channel will also transmit the binary valued load indicator data on a sub-band basis for its neighbors cell activity. At a minimum, access node 940 provides the load data for end nodes 944 through 946 as well as which sub-bands all neighboring cells are using including end nodes 944', 946', 944" through 946".

Note, that while this an exemplary model, this invention is not limited to this model and covers all permutations as captured in the claims. If the cells are sectored as in a frequency reuse scenario, then the neighbor sector binary load indicator data per sub-band would be transmitted (not shown).

Exemplary communication system 900 is presented as a basis for the description of various aspects set forth herein. Further, various disparate network topologies are intended to fall within the scope of the claimed subject matter, where the number and type of network nodes, the number and type of access nodes, the number and type of end nodes, the number and type of Servers and other Agents, the number and type of links, and the interconnectivity between nodes may differ from that of exemplary communication system 900 depicted in FIG. 9. Additionally, functional entities depicted in exemplary communication system 100 may be omitted or combined. Also, the location or placement of the functional entities in the network may be varied.

Figure 10:
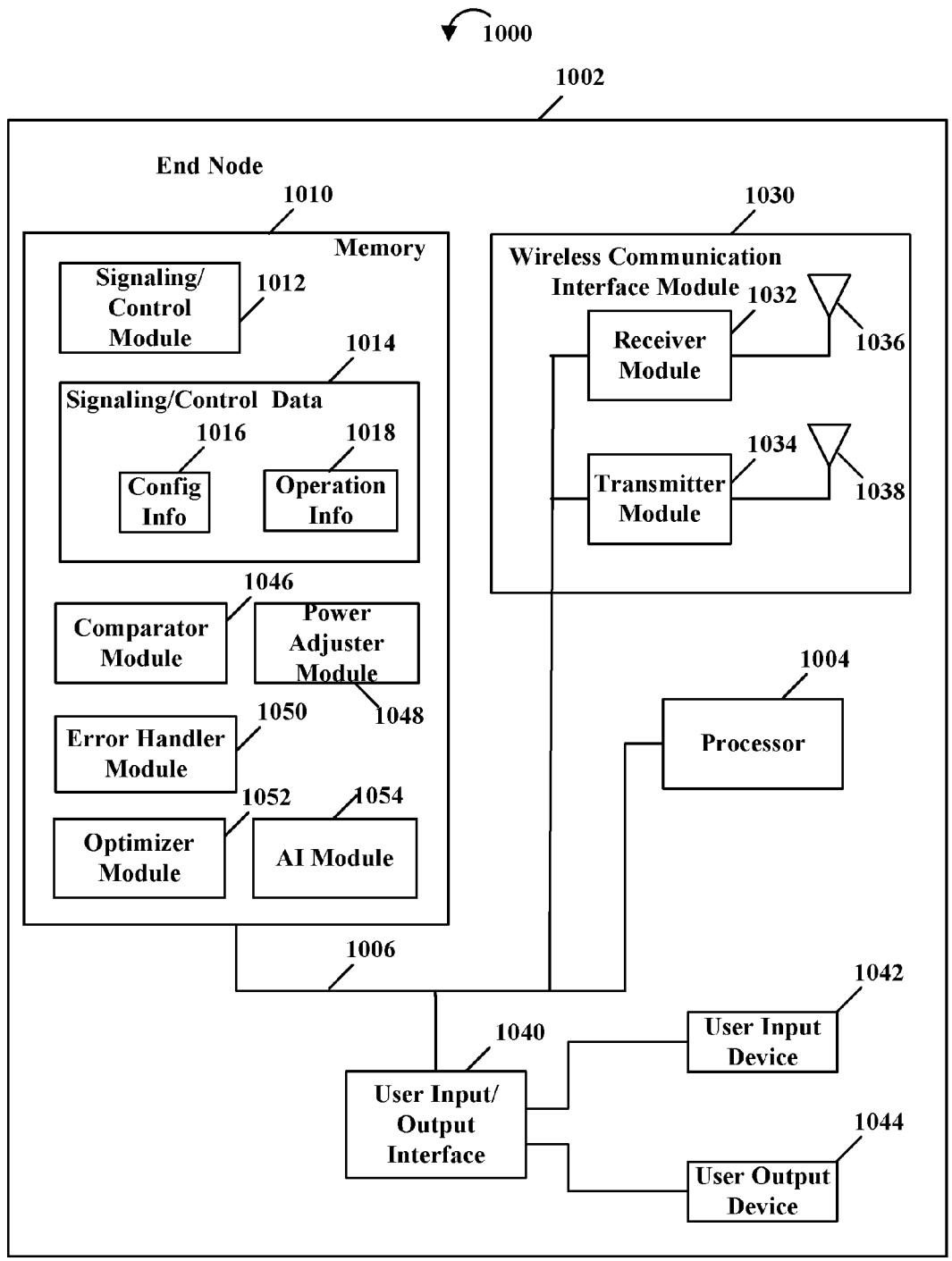
FIG. 10 is an illustration of an exemplary end node (e.g., a mobile node) associated with various aspects.

FIG. 10 illustrates an exemplary end node 1000 (e.g., a mobile node, a wireless terminal, user equipment) associated with various aspects. Exemplary end node 1000 may be an apparatus that may be used as any one of the end nodes depicted in FIG. 9 (e.g. 944, 946, 944', 946', 944", 946"). As depicted, end node 1000 includes a processor 1004, a wireless communication interface 1030, a user input/output interface 1040 and memory 1010 coupled together by a bus 1006. Accordingly, various components of end node 1000 can exchange information, signals and data via bus 1006. Components 1004, 1006, 1010, 1030, 1040 of end node 1000 may be located inside a housing 1002.

Wireless communication interface 1030 provides a mechanism by which the internal components of the end node 1000 can send and receive signals to/from external devices and network nodes (e.g., access nodes). Wireless communication interface 1030 includes, for example, a receiver module 1032 with a corresponding receiving antenna 1036 and a transmitter module 1034 with a corresponding transmitting antenna 1038 used for coupling end node 1000 to other network nodes (e.g., via wireless communications channels).

Exemplary end node 1000 also includes a user input device 1042 (e.g., keypad) and a user output device 1044 (e.g., display), which are coupled to bus 1006 via user input/output interface 1040. Thus, user input device 1042 and user output device 1044 can exchange information, signals and data with other components of end node 1000 via user input/output interface 1040 and bus 1006. User input/output interface 1040 and associated devices (e.g., user input device 1042, user output device 1044) provide a mechanism by which a user can operate end node 1000 to accomplish various tasks. In particular, user input device 1042 and user output device 1044 provide functionality that allows a user to control end node 1000 and applications (e.g., modules, programs, routines, functions, etc.) that execute in memory 1010 of end node 1000.

Processor 1004 may be under control of various modules (e.g., routines) included in memory 1010 and may control operation of end node 1000 to perform various signaling and processing as described herein. The modules included in memory 1010 are executed on startup or as called by other modules. Modules may exchange data, information, and signals when executed. Modules may also share data and information when executed. Memory 1010 of end node 1000 may include a signaling/control module 1012 and signaling/control data 1014.

Signaling/control module 1012 controls processing relating to receiving and sending signals (e.g., messages) for management of state information storage, retrieval, and processing. Signaling/control data 1014 includes state information such as, for instance, parameters, status, and/or other information relating to operation of the end node. In particular, signaling/control data 1014 may include configuration information 1016 (e.g., end node identification information) and operational information 1018 (e.g., information about current processing state, status of pending responses, etc.). Signaling/control module 1012 may access and/or modify signaling/control data 1014 (e.g., update configuration information 1016 and/or operational information 1018).

Memory 1010 of end node 1000 may also include a comparator module 1046, a power adjuster module 1048, and/or an error handler module 1050. Although not depicted, it is to be appreciated that comparator module 1046, power adjuster module 1048, and/or error handler module 1050 may store and/or retrieve data associated therewith that may be stored in memory 1010. Comparator module 1046 may evaluate received information associated with end node 1000 and effectuate a comparison with expected information.

End node 1000 may further include a power adjuster module 1048 and a comparator module 1046. Power adjuster module 1048 may measure a power level associated with access node 1100 (FIG. 11) (and/or any disparate wireless terminals). Further, power adjuster module 1048 may transmit power commands to access node 1100 to facilitate adjusting the power level. For instance, power adjuster module 1048 may transmit a power command in one or more transmission units associated with a first subset of transmission units. The power commands, for instance, may indicate to increase a power level, decrease a power level, remain at a power level, and the like. Upon receipt of power commands to increase or decrease power, access node 1100 may alter an associated power level a fixed (e.g., preset) and/or variable amount. The preset amounts may be of variable size based on certain factors (e.g., frequency reuse factors, channel conditions at different mobile stations). Further, comparator module 1046 may transmit information as a function of a terminal identifier related to a wireless terminal (e.g., access node 1100) in one or more transmission units associated with a second subset of transmission units. Moreover, one or more ON identifiers may be assigned to each wireless terminal when in session ON state and the ON identifiers may be associated with a first subset and second subset of transmission units. Transmission units may be in variable formats (e.g., time domain, frequency domain, hybrid of both time and frequency domains).

Power adjuster module 1048 may transmit power commands over a downlink power control channel (DLPCCH). Pursuant to an example, resources may be assigned to access node 1100 by end node 1000 as access node 1100 accesses a session ON state; such resources may include particular DLPCCH segments, one or more ON identifiers, etc. The DLPCCH may be utilized by a base station sector attachment point (e.g., employing power adjuster module 1048) to transmit downlink power control messages to control transmission power of access node 1100.

Comparator module 1046 may transmit information associated with a wireless terminal (e.g., access node 1100) to which the power commands correspond along with the power commands transferred by power adjuster module 1048. For example, comparator module 1046 may transmit information as a function of a terminal identifier (e.g., scrambling mask) associated with the wireless terminal (e.g., access node 1100). Comparator module 1046 may transfer such information over the DLPCCH. Pursuant to an illustration, information associated with access node 1100 may be transmitted over the DLPCCH with a subset of the power command transmissions from power adjuster module 1048.

Optimizer Module 1052 can be employed in connection with assignments with extrinsic information (e.g., environmental factors, preferences, QoS, customer preferences, customer ranking, historical information) Artificial Intelligence (AI) Module 1054 can employ artificial intelligence techniques to facilitate automatically performing various aspects (e.g., transitioning communications resources, analyzing resources, extrinsic information, user/UE state, preferences, sub-band assignments, power level setting) as described herein. Moreover, inference based schemes can be employed to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated.

Figure 11:
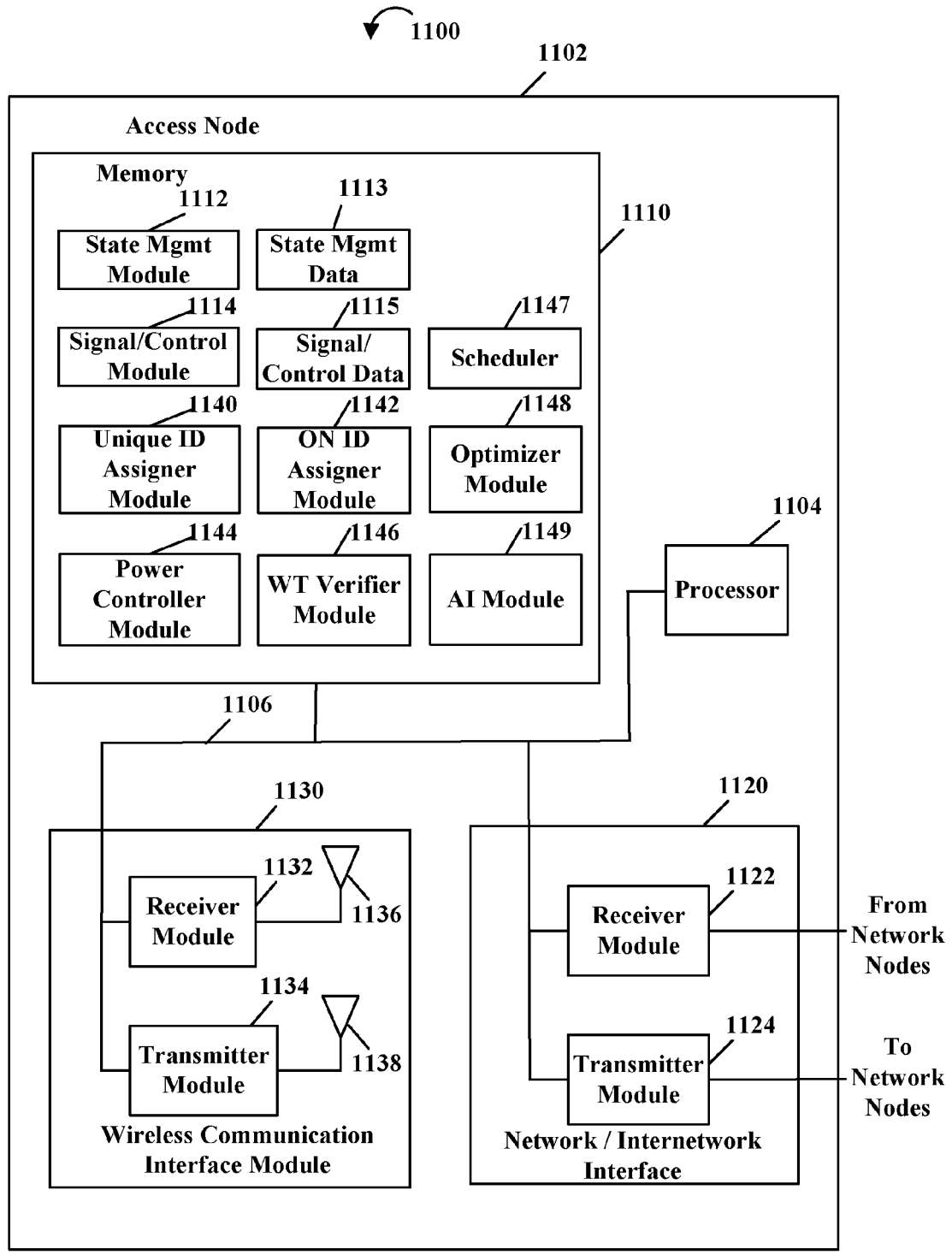
FIG. 11 is an illustration of an exemplary access node implemented in accordance with various aspects described herein.

FIG. 11 provides an illustration of an exemplary access node 1100 implemented in accordance with various aspects described herein. Exemplary access node 1100 may be an apparatus utilized as any one of access nodes depicted in FIG. 9 (e.g., 940, 940', and 940"). Access node 1100 may include a processor 1104, memory 1110, a network/internetwork interface 1120 and a wireless communication interface 1130, coupled together by a bus 1106. Accordingly, various components of access node 1100 can exchange information, signals and data via bus 1106. The components 1104, 1106, 1110, 1120, 1130 of the access node 1100 may be located inside a housing 11102.

Network/internetwork interface 1120 provides a mechanism by which the internal components of access node 1100 can send and receive signals to/from external devices and network nodes. Network/internetwork interface 1120 includes a receiver module 1122 and a transmitter module 1124 used for coupling access node 1100 to other network nodes (e.g., via copper wires or fiber optic lines). Wireless communication interface 1130 also provides a mechanism by which the internal components of access node 1100 can send and receive signals to/from external devices and network nodes (e.g., end nodes). Wireless communication interface 1130 includes, for instance, a receiver module 1132 with a corresponding receiving antenna 1136 and a transmitter module 1134 with a corresponding transmitting antenna 1138. Wireless communication interface 1130 may be used for coupling access node 1100 to other network nodes (e.g., via wireless communication channels).

Processor 1104 may be under control of various modules (e.g., routines) included in memory 1110 and may control operation of access node 1100 to perform various signaling and processing. The modules included in memory 1110 may be executed on startup or as called by other modules that may be present in memory 1110. Modules may exchange data, information, and signals when executed. Modules may also share data and information when executed. By way of example, memory 1110 of access node 1100 may include a State Management module 1112 and a Signaling/Control module 1114. Corresponding to each of these modules, memory 1110 also includes State Management data 1113 and the Signaling/Control data 1115.

State Management Module 1112 controls the processing of received signals from end nodes or other network nodes regarding state storage and retrieval. State Management Data 1113 includes, for instance, end-node related information such as the state or part of the state, or the location of the current end node state if stored in some other network node. State Management module 1112 may access and/or modify State Management data 1113.

Signaling/Control module 1114 controls the processing of signals to/from end nodes over wireless communication interface 1130 and to/from other network nodes over network/internetwork interface 1120 as necessary for other operations such as basic wireless function, network management, etc. Signaling/Control data 1115 includes, for example, end-node related data regarding wireless channel assignment for basic operation, and other network-related data such as the address of support/management servers, configuration information for basic network communications. Signaling/Control module 1114 may access and/or modify Signaling/Control data 1115.

Memory 1110 may additionally include a unique identification (ID) assigner module 1140, an ON identification (ID) assigner module 1142, a power controller module 1144, and/or a wireless terminal (WT) verifier module 1146. It is to be appreciated that unique ID assigner module 1140, ON ID assigner module 1142, power controller module 1144, and/or WT verifier module 1146 may store and/or retrieve associated data retained in memory 1110. Further, unique ID assigner module 1140 may allocate a terminal identifier (e.g., scrambling mask) to a wireless terminal. ON ID assigner module 1142 may assign an ON identifier to a wireless terminal while the wireless terminal is in session ON state. Power controller module 1144 may transmit power control information to a wireless terminal. WT verifier module 1146 may enable including wireless terminal related information in a transmission unit.

Access node 1100 may further include a comparator module 1046 that evaluates the received information associated with access node 1100. Comparator module 1046 may analyze the received information to determine whether access node 1100 is utilizing resources as set forth by end node 1000; thus, comparator module 1046 may evaluate information included in the Q component of symbols transmitted over the DLPCCH. For instance, end node 1000 may have assigned identifier(s) (e.g., session ON ID) to access node 1100, and comparator module 1046 may analyze whether access node 1100 employs appropriate resources associated with the assigned identifier(s). According to other examples, comparator module 1046 may determine whether access node 1100 is utilizing segments of the DLPCCH allocated by end node 1000 and/or whether end node 1000 has reclaimed resources (e.g., session ON ID) previously assigned to access node 1100.

Scheduler Module 1147 utilizes the data from various modules to control the assignment of sub-bands and other resource management functions in relation to aspects disclosed herein.

Optimizer Module 1148 can be employed in connection with assignments with extrinsic information (e.g., environmental factors, preferences, QoS, customer preferences, customer ranking, historical information) Artificial Intelligence (AI) Module 1149 can employ artificial intelligence techniques to facilitate automatically performing various aspects (e.g., transitioning communications resources, analyzing resources, extrinsic information, user/UE state, preferences, sub-band assignments, power level setting) as described herein. Moreover, inference based schemes can be employed to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated.

In view of exemplary aspects described herein, methodologies that can be implemented in accordance with the disclosed subject matter are discussed. While, for purposes of simplicity, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement respective methodologies. It is to be appreciated that the functionality associated with various blocks may be implemented by software, hardware, a combination thereof or any other suitable means (e.g., device, system, process. component). Additionally, it should be further appreciated that some methodologies disclosed hereinafter and throughout this specification are capable of being stored on an article of manufacture to facilitate transporting and transferring such methodologies to various devices. Those skilled in the art will appreciate and understand that a methodology can alternatively be represented as a series of interrelated states or events such as for example in a state diagram.

Figure 12:
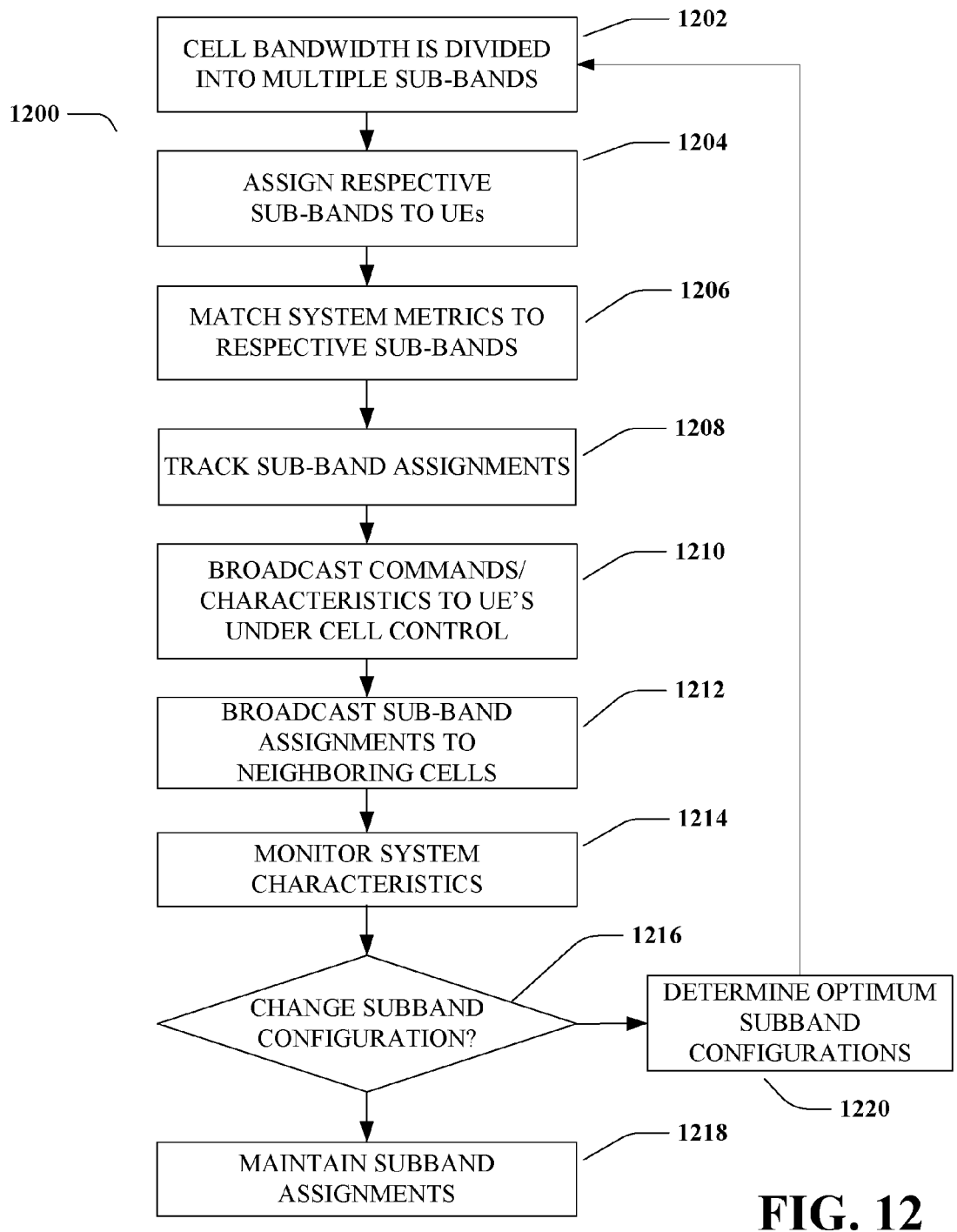
FIG. 12 is an exemplary high level logic flow diagram for implementing variable and flexible system operational characteristics for different sub-bands in accordance with various aspects

FIG. 12 illustrates a high-level methodology in accordance with various aspects. At 1202, cell bandwidth is divided into N sub-bands (N being an integer >2). At 1204, respective sub-bands are assigned to respective user equipment (UE). It is to be appreciated that a variety of assignment protocols can be employed in connection with making sub-band assignments. For example, respective sub-bands can be designated for particular purposes (e.g., data type, power level, distance, interference mitigation, load-balancing . . . ), and UEs can be respectively assigned to sub-bands as a function of affinity thereto. Furthermore, it is to be appreciated that sub-band assignments for like groups do not have to be contiguous in the bandwidth spectrum.

At 1206 sub band assignments are matched with respective system operational characteristics. This includes at least power control, admission control, congestion control, and signal handoff control.

At 1208, sub-band assignments are tracked. At 1210, commands and system characteristics are broadcast to the UE's under the particular serving cell's control. At 1212, sub-band assignments are broadcast to neighboring cells (e.g., to apprise base stations or UEs in such neighboring cells of sub-band assignments). The broadcast may be by through a backhaul channel, over the air direct to neighboring cells or other methods. At 1214, serving cell system characteristics as well as neighboring cell sub-band assignments are monitored. At 1216, as a result of such monitoring, if it is determined that sub-band configurations have or should change, an optimization scheme can be employed in connection with configurations 1220; otherwise sub-band assignments are maintained at 1218. The optimization scheme of 1220 can employ extrinsic information (e.g., environmental factors, preferences, QoS, customer preferences, customer ranking, historical information). In another example, assignment can be a function of load-balancing across a cell or a plurality of cells.

An embodiment of the methodology can employ an artificial intelligence techniques to facilitate automatically performing various aspects (e.g., transitioning communications resources, analyzing resources, extrinsic information, user/UE state, preferences, sub-band assignments, power level setting) as described herein. Moreover, inference based schemes can be employed to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated.

Figure 13:
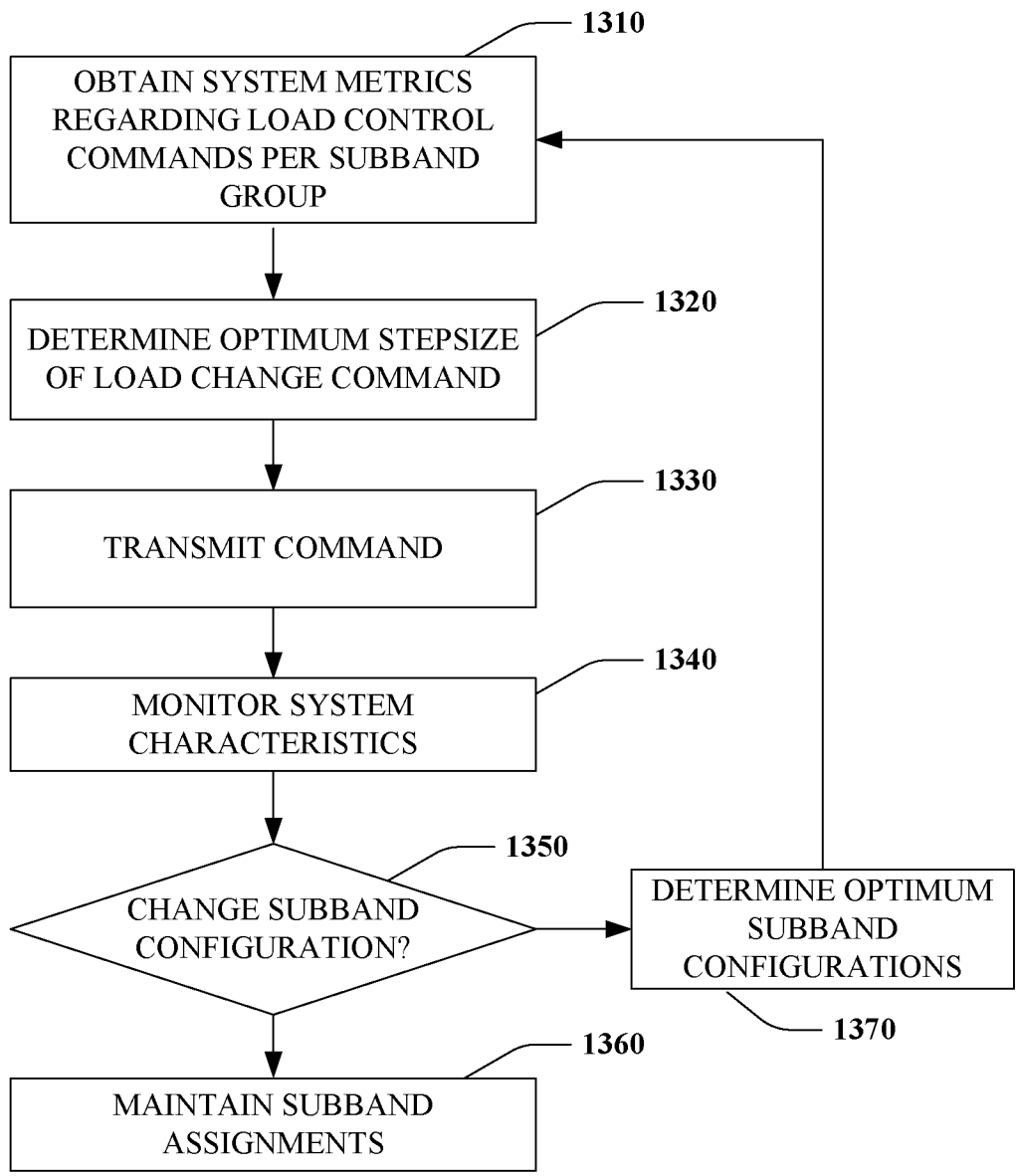
FIG. 13 is an exemplary high level logic flow diagram for processing variable and flexible system operational characteristics for different sub-bands in accordance with various aspects.

FIG. 13 illustrates a high-level methodology in accordance with various aspects in the specific case of system load control. At 1310 the system metrics related to load control are obtained. The information herein has been processed for sub-band dependent load control.

At 1320 the optimum stepsize of the load change commands is determined. This step is covered in more detail in the mid-level methodology of FIG. 14. At 1330, command (and associated characteristics per sub-band) are transmitted to UE and neighboring cells. The transmission (and/or coding) of load control commands can be made to be dependent on the number of bits allocated over the air interface for load control, be it cycling through the entire bandwidth a sub-band at a time, a group at a time, a single bit at a time, a set of bits at a time or a combination thereof. In order to propagate the load control information for all sub-band groups, we can transmit one sub-band group load control over the air at a time and cycle through the entire sub-band groups over time. At 1340 system characteristics are monitored. At 1350, as a result of such monitoring, if it is determined that sub-band configurations have or should change, an optimization scheme can be employed in connection with sub-band configurations 1370; otherwise sub-band assignments are maintained at 1360. The optimization scheme of 1370 can employ extrinsic information and artificial intelligence techniques as discussed supra.

Figure 14:
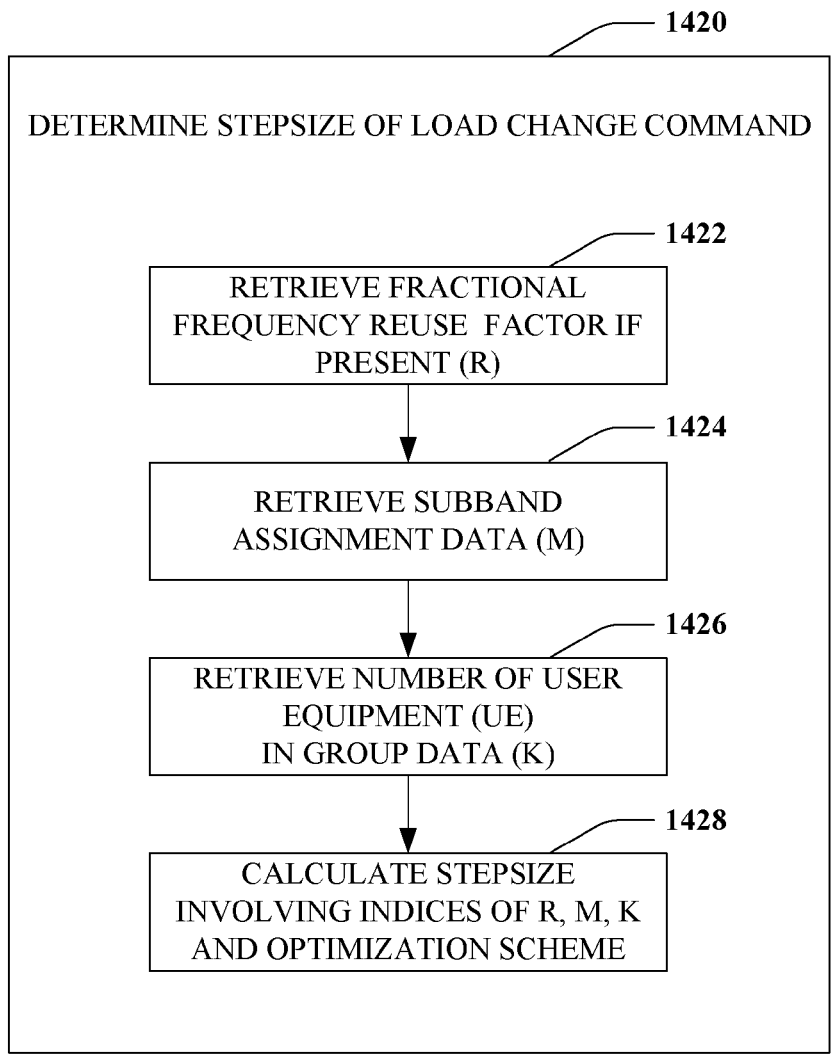
FIG. 14 is an exemplary mid level logic flow diagram in accordance with various aspects

FIG. 14 illustrates the methodology in accordance with various aspects of the load control determination. The power spectral density (PSD) adjustment stepsizes (SS) can be designed differently for different sub-band group commands, differently for different mobile stations (channel conditions) and/or differently for different cells, especially for different frequency reuse factors. That is, the stepsizes (e.g., for down, up or hold commands) can be denoted as $\Delta$ (K, M, R)$\geq 0$, where K is the index of mobile stations 1436, M is the index of sub-band groups 1434 and R is the frequency reuse index. 1432. The stepsizes could be zero for some combinations of K, M, and R. Determination of optimum transmission, coding and stepsize configurations may be performed through an optimization scheme as noted supra.

Figure 15:
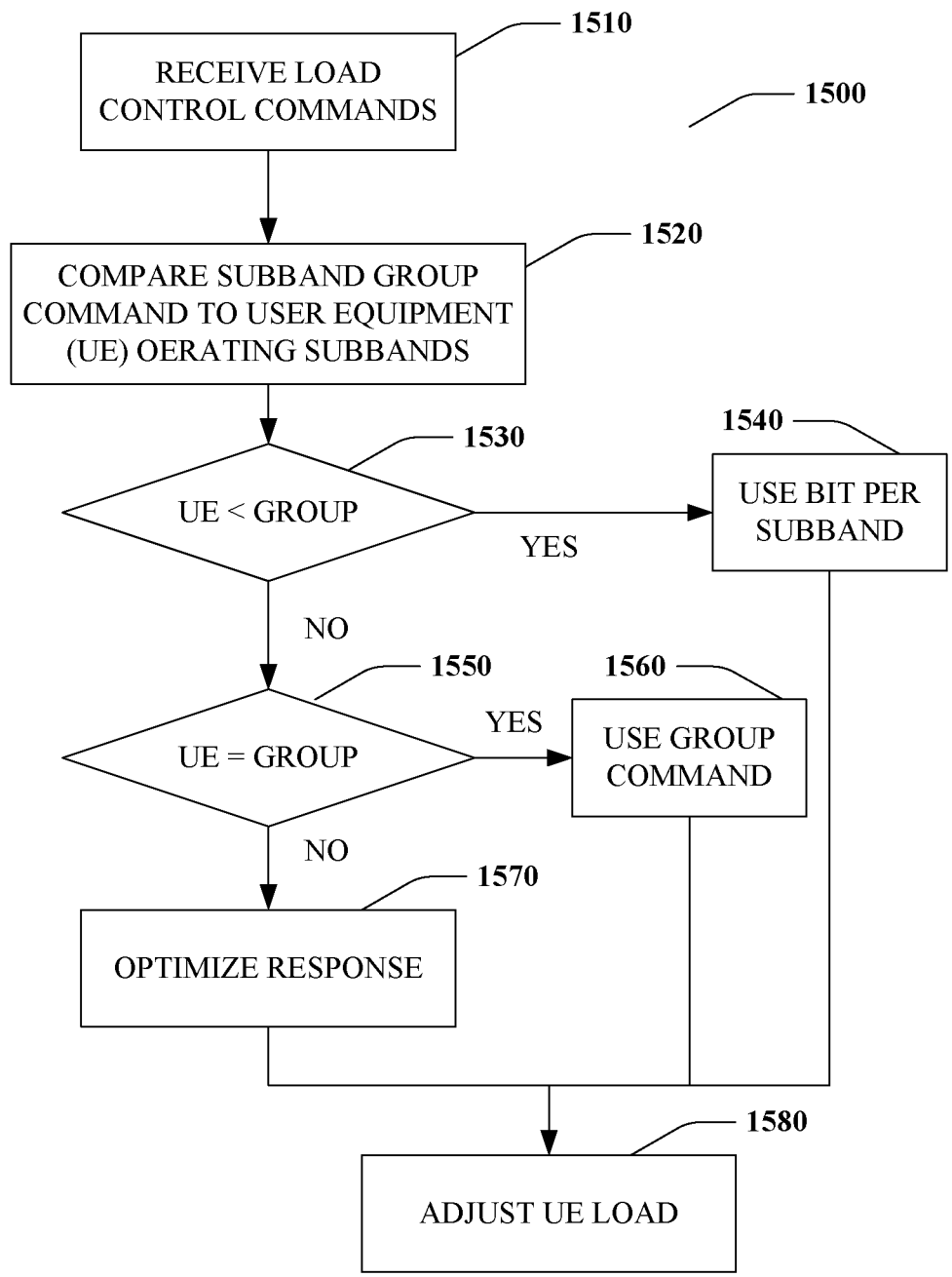
FIG. 15 is an exemplary high level logic flow diagram for processing variable and flexible load control commands in accordance with various aspects

FIG. 15 illustrates another high level methodology in accordance with various aspects. At 1510, a User Equipment (UE) receives load control commands and associated system characteristics on a sub-band dependent basis. At 1520, the sub-band group commands are compared to the UE operating sub-bands. If at 1530, the number of UE operating sub-bands is smaller than the number of sub-bands in the sub-band group command, a response at 1540 would be to use a bit per sub-band control mechanism, otherwise, 1550 is evaluated. At 1550, if the sub-bands of the UE match the sub-bands of the group, the group command 1560 is used as the response. If at 1550, it is determined that the sub-bands of the UE are greater than the number of sub-bands in the sub-band group command, than at 1570 an optimization scheme is utilized (e.g. FIG. 16) to obtain an optimized response. At 1580 each of the above responses are used as appropriate to adjust the UE load.

Figure 16:
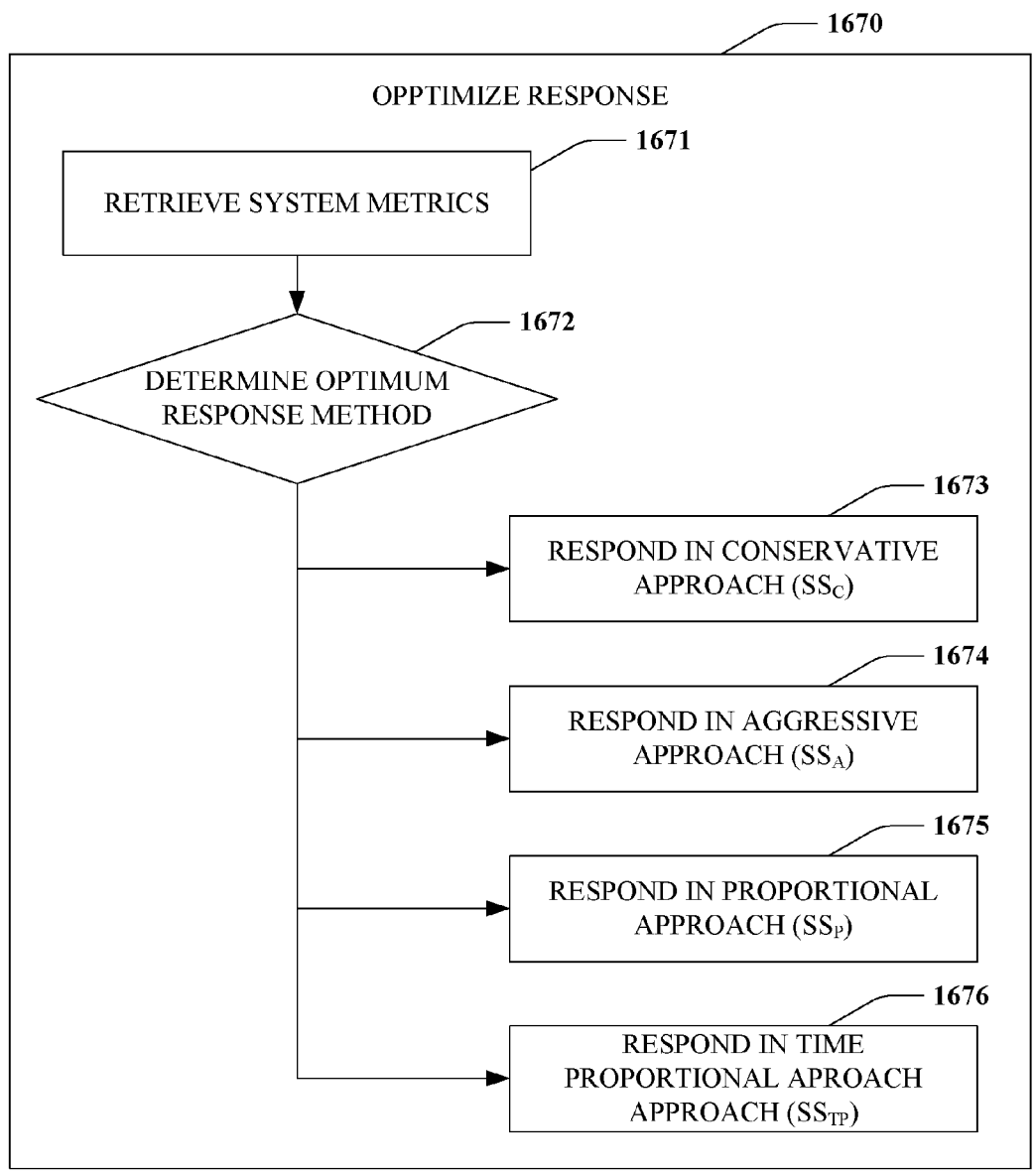
FIG. 16 is an exemplary mid level logic flow diagram in accordance with various aspects

FIG. 16 illustrates a mid level methodology in accordance with various aspects, particularly optimizing results in the case where it is determined that the sub-bands of the UE are greater than the number of sub-bands in the sub-band group command. At 1671, the system metrics are retrieved. At 1672 an optimization scheme is utilized to determine the best approach of conservative $SS_C$ 1773, aggressive $SS_A$ 1774, Proportional $SS_P$ 1775 or Time Proportional $SS_{TP}$ 1776. These approaches are covered in greater detail in FIG. 7. The optimization scheme of 1672 can employ extrinsic information (e.g., environmental factors, preferences, QoS, customer preferences, customer ranking, historical information). In another example, assignment can be a function of load-balancing across a cell or a plurality of cells.

An embodiment of the methodology can employ an artificial intelligence techniques to facilitate automatically performing various aspects (e.g., transitioning communications resources, analyzing resources, extrinsic information, user/UE state, preferences, sub-band assignments, power level setting) as described herein. Moreover, inference based schemes can be employed to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated.

Figure 17:
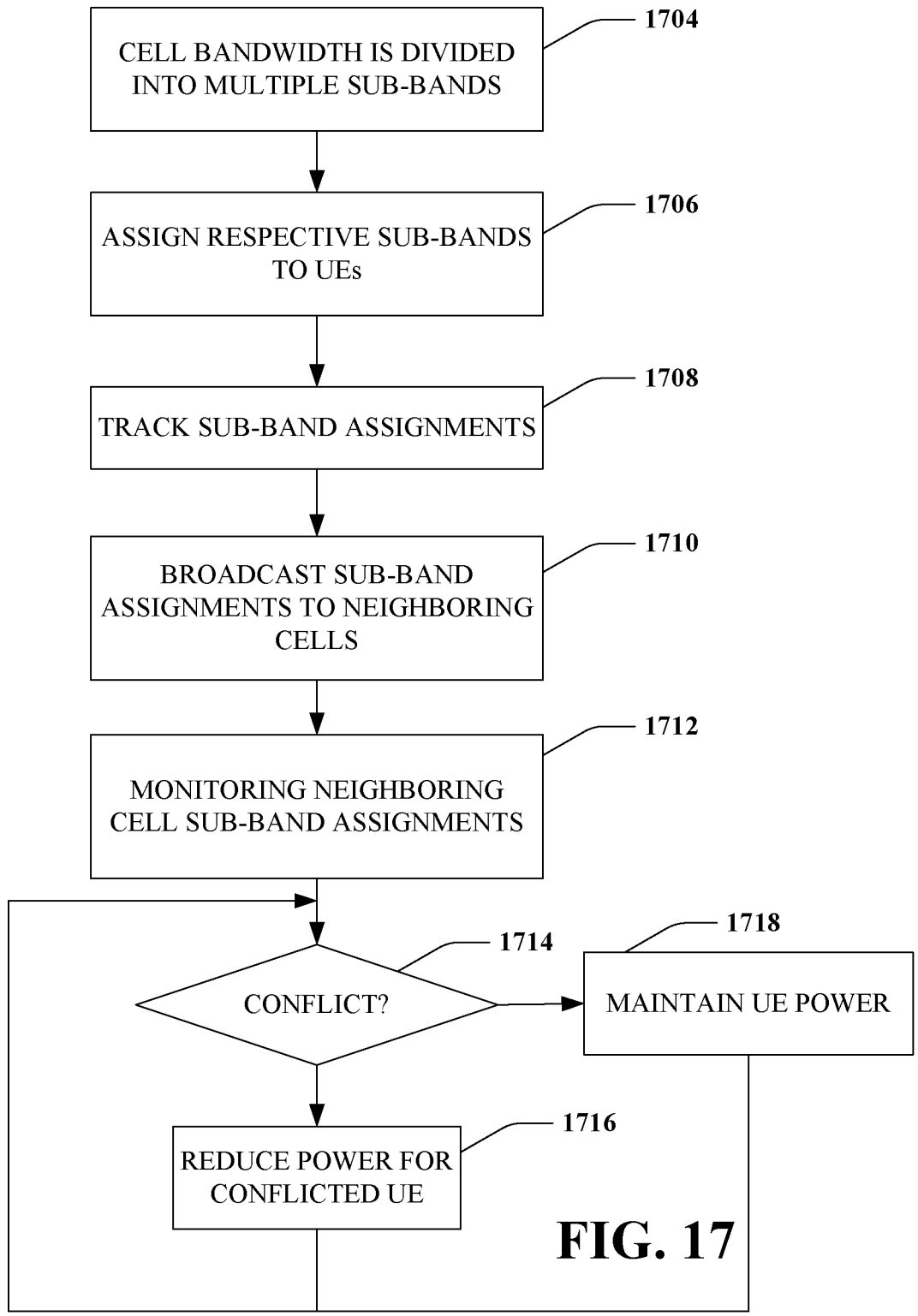
FIG. 17 is a flow diagram illustrating an aspect relating to mitigating inter-cell interference.

FIG. 17 illustrates a high-level methodology in accordance with various aspects. At 1704, cell bandwidth is divided into N sub-bands (N being an integer >2). At 1706, respective sub-bands are assigned to respective user equipment (UE). It is to be appreciated that a variety of assignment protocols can be employed in connection with making sub-band assignments. For example, respective sub-bands can be designated for particular purposes (e.g., data type, power level, distance, interference mitigation, load-balancing . . . ), and UEs can be respectively assigned to sub-bands as a function of affinity thereto.

In another example, an optimization scheme can be employed in connection with assignments. Likewise, extrinsic information (e.g., environmental factors, preferences, QoS, customer preferences, customer ranking, historical information) can be employed. In another example, assignment can be a function of load-balancing across a cell or a plurality of cells.

An embodiment of the methodology can employ an artificial intelligence techniques to facilitate automatically performing various aspects (e.g., transitioning communications resources, analyzing resources, extrinsic information, user/UE state, preferences, sub-band assignments, power level setting) as described herein. Moreover, inference based schemes can be employed to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated.

At 1708, sub-band assignments are tracked. At 1710, sub-band assignments are broadcast to neighboring cells (e.g., to apprise base stations or UEs in such neighboring cells of sub-band assignments). At 1712, neighboring cell sub-band assignments are monitored. At 1714, as a function of such monitoring, if it is determined that a conflict exists with respect to sub-band assignments at 1716 control information is sent to particular UEs to reduce power in connection with mitigating inter-cell interference due to the conflict, for example. If no conflict exists, at 1718 the UEs maintain power level.

It can be readily appreciated from the foregoing that by sub-dividing bandwidth into respective sub-bands a more granular tuning of UE power-level can be achieved as compared to conventional schemes. As a result, overall system resource utilization as well as inter-cell interference mitigation is facilitated.

Figure 18:
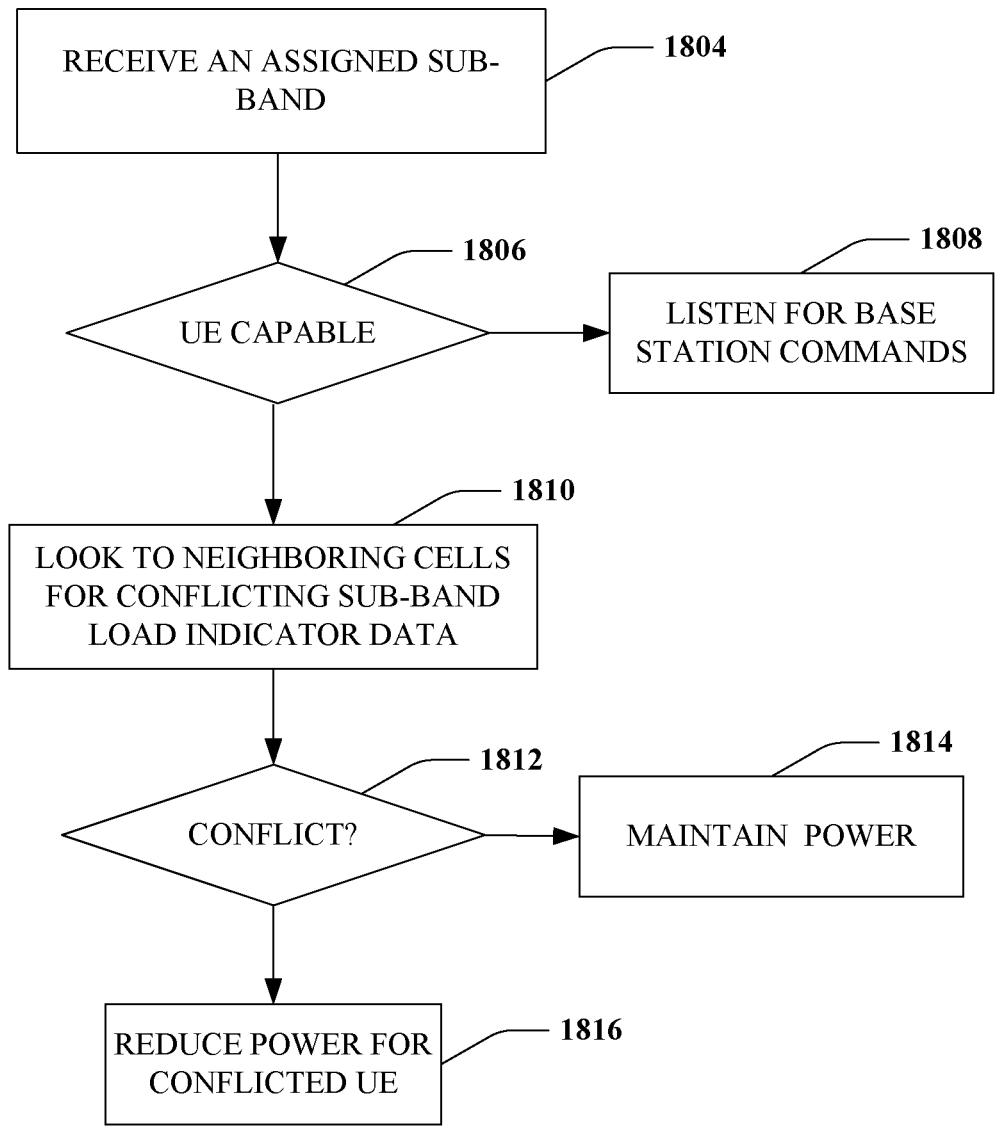
FIG. 18 is a flow diagram illustrating an aspect relating to mitigating inter-cell interference.

FIG. 18 illustrates a high-level methodology in accordance with various aspects. At 1804, sub-band assignment(s) are received by a user equipment. At 1806, a determination or identification is made as to respective capabilities/functionalities of the UE. If the UE is deemed to not possess certain capabilities/functionalities, the UE simply listens for commands from a base station in connection with sub-band assignments at 1808. However, if the UE does possess certain capabilities or functionalities in connection with aspects described herein, at 1810, the UE looks to neighboring cells for conflicting sub-band load indicator data. At 1812, a determination is made regarding whether or not a conflict exists as a function of respective sub-band load indicator data. If a conflict does exist, the UE reduces power level to mitigate interference it may cause. If it is determined that a conflict does not exist, at 1814, the UE maintains power level.

Figure 19:
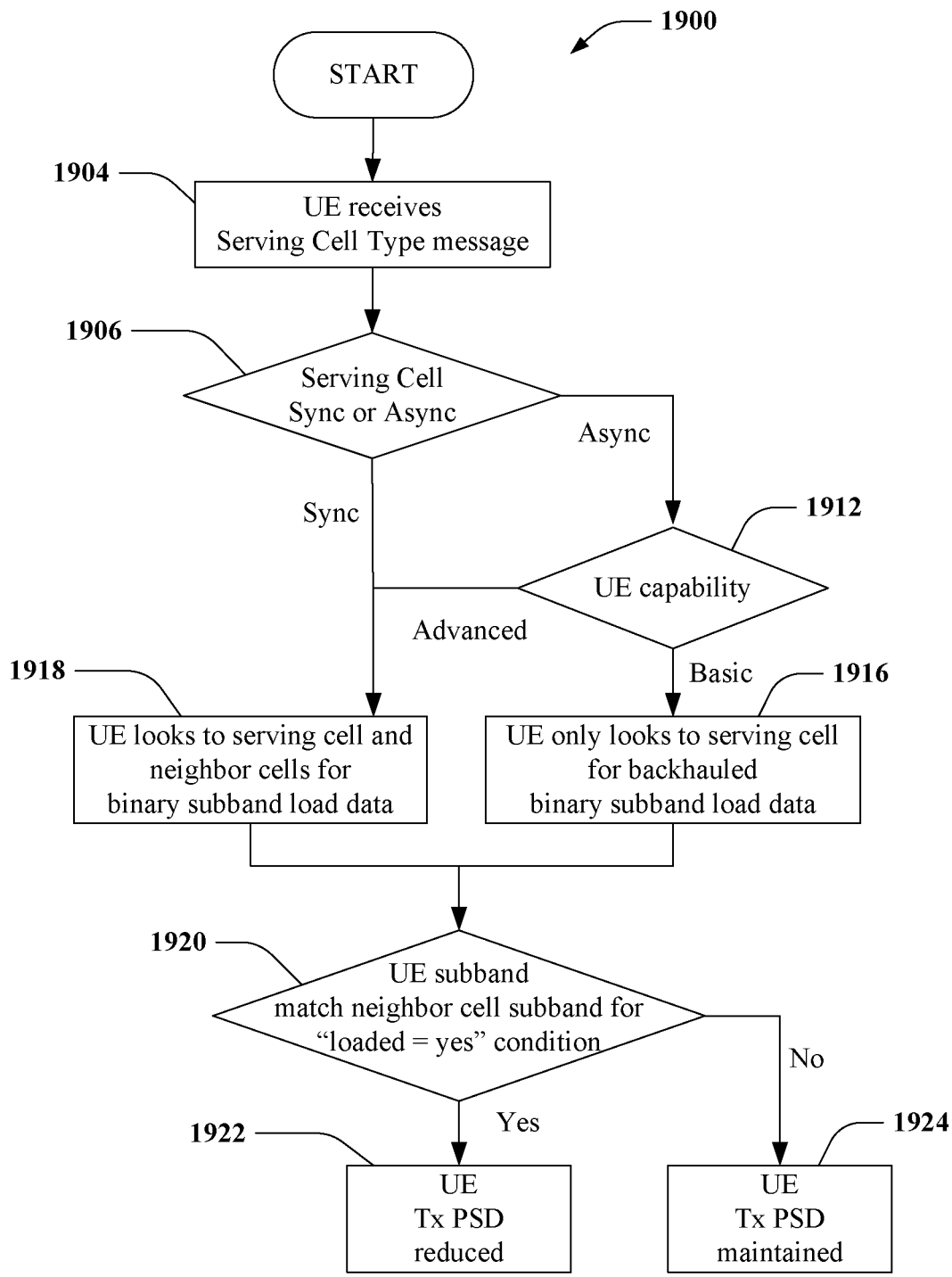
FIG. 19 is an exemplary logic flow diagram for UE based inter-cell interference mitigation in synchronous and asynchronous orthogonal systems in accordance with various aspects.

FIG. 19 highlights exemplary logic for a management method in accordance with various aspects. The management method 1900 is for a UE based inter-cell interference mitigation system that robustly handles both synchronous and asynchronous orthogonal systems. At 1904, for each UE in a given serving cell, the UE receives a serving cell Type message indicating whether the serving cell is operating in synchronous or asynchronous mode. At 1906, the US determines or is informed of whether a serving cell is synchronous or asynchronous. If the cell is synchronous, the process proceeds to 1918 where the US looks to the serving cell or neighboring cells for binary sub-band load data. If at 1906, the cell is asynchronous, the process proceed to 1912 where capabilities of the UE are assessed. If the UE is deemed to have advanced capabilities, the process proceeds to 1918. If the US is deemed to have basic capabilities, the process proceeds to 1916 where the UE looks to the serving cell for backhauled binary sub-band data. Block 1918 signifies various advantages (e.g. faster neighbor cell detection, neighbor cell load data being obtained directly from the neighbor cell). For other less capable UE, path 1916 will still provide the novel binary sub-band load data transmitted from UE's serving cell and obtained through the backhaul channel. In either path, the binary load data per sub-band is obtained and a comparison at 1920 can take place.

At this point the finer granularity as shown in FIG. 7 will provide the UE with the control direction to take either step 1922 or 1924 with increased room for more UE operating in the different sub-bands of a given bandwidth.

Figure 20:
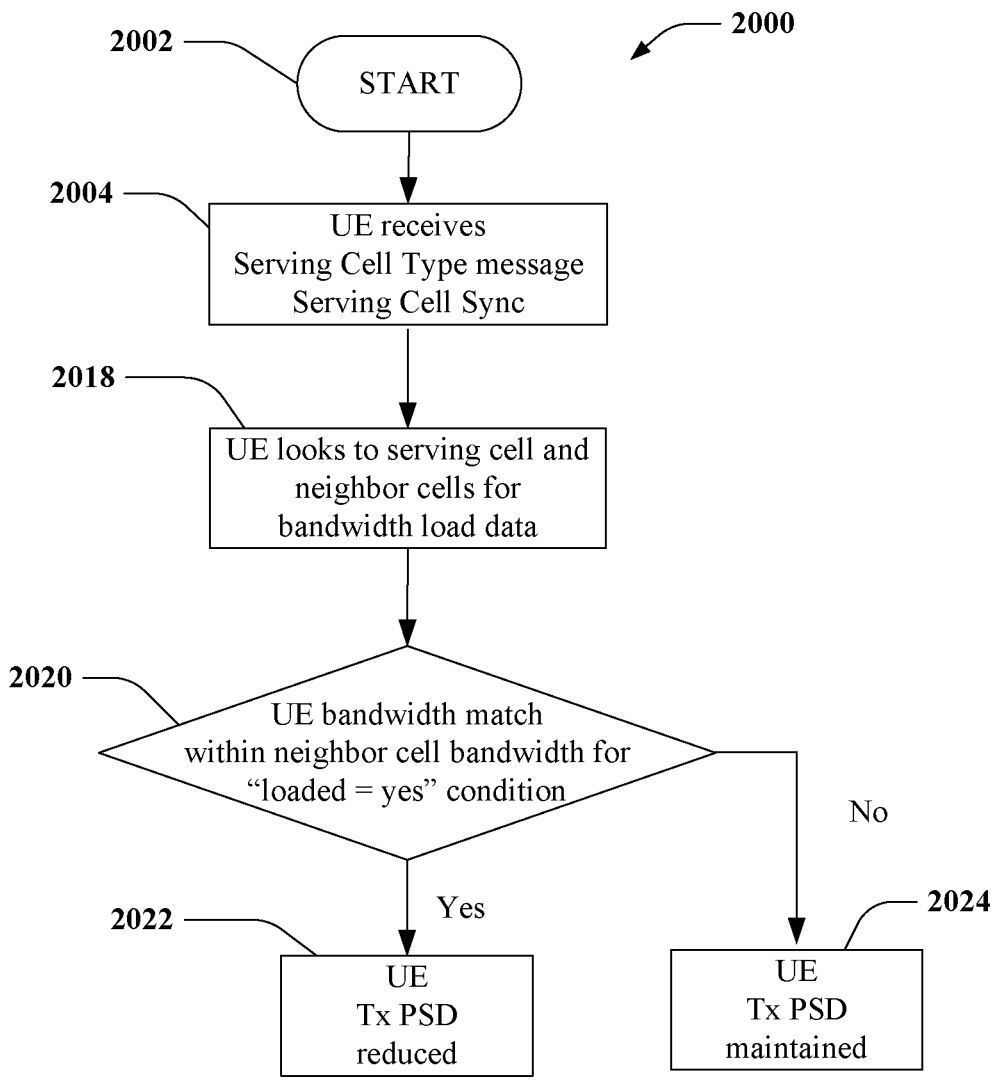
FIG. 20 is an exemplary logic flow diagram for UE based inter-cell interference mitigation in synchronous orthogonal systems.
Figure 21:
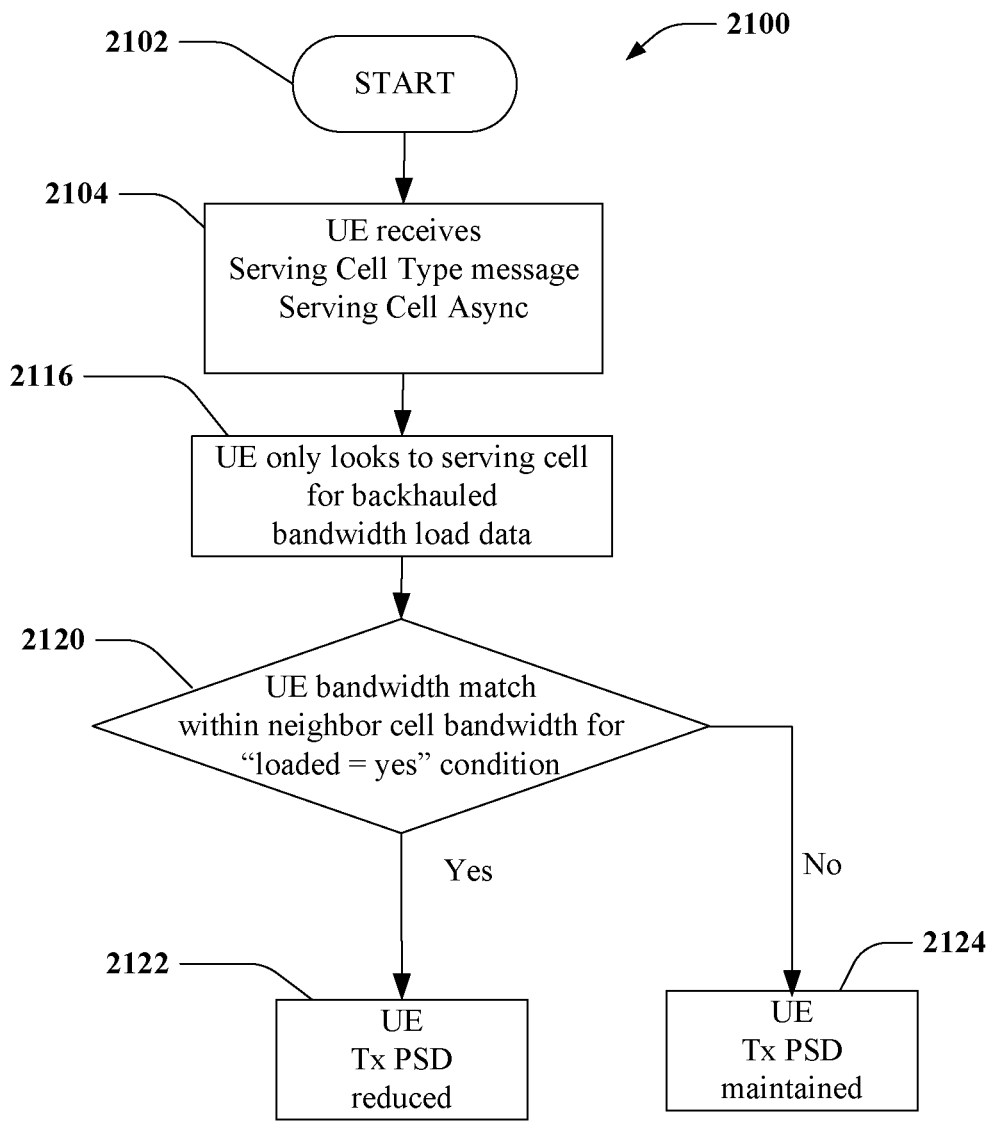
FIG. 21. is an exemplary logic flow diagram for UE based inter-cell interference mitigation in asynchronous orthogonal systems.

This can be contrasted with FIGS. 20 and 21, which shows the less robust conventional alternatives. In FIG. 20, upon start 2002, the UE receives the serving cell Type message 2004 and the serving cell type mandates the UE's next step 2018. Here the entire bandwidth of the neighboring cells' data as obtained directly and quickly from the neighbor cells and compared to the load data from the serving cell 2020. The less efficient direction (e.g. UE using non-interfering different sub-bands within matching bands will be indicated as causing interference when they in actuality are not) for the UE is dictated and either 2022 or 2024 will then be taken.

In FIG. 21, the UE at start 2102 receives the serving cell Type message 2104 which mandates step 2116. Here the entire bandwidth from the slower backhaul channel as provided by the serving cell is obtained and compared to the UE bandwidth in the serving cell 2120. The less efficient direction (e.g. UE using non-interfering different sub-bands within matching bands will be indicated as causing interference when they in actuality are not) for the UE is dictated and either 2122 or 2124 will then be taken. UE capability is ignored. The systems as represented in FIGS. 20 and 21 are also less UE based as the Serving Cell system mandates the path.

Figure 22:
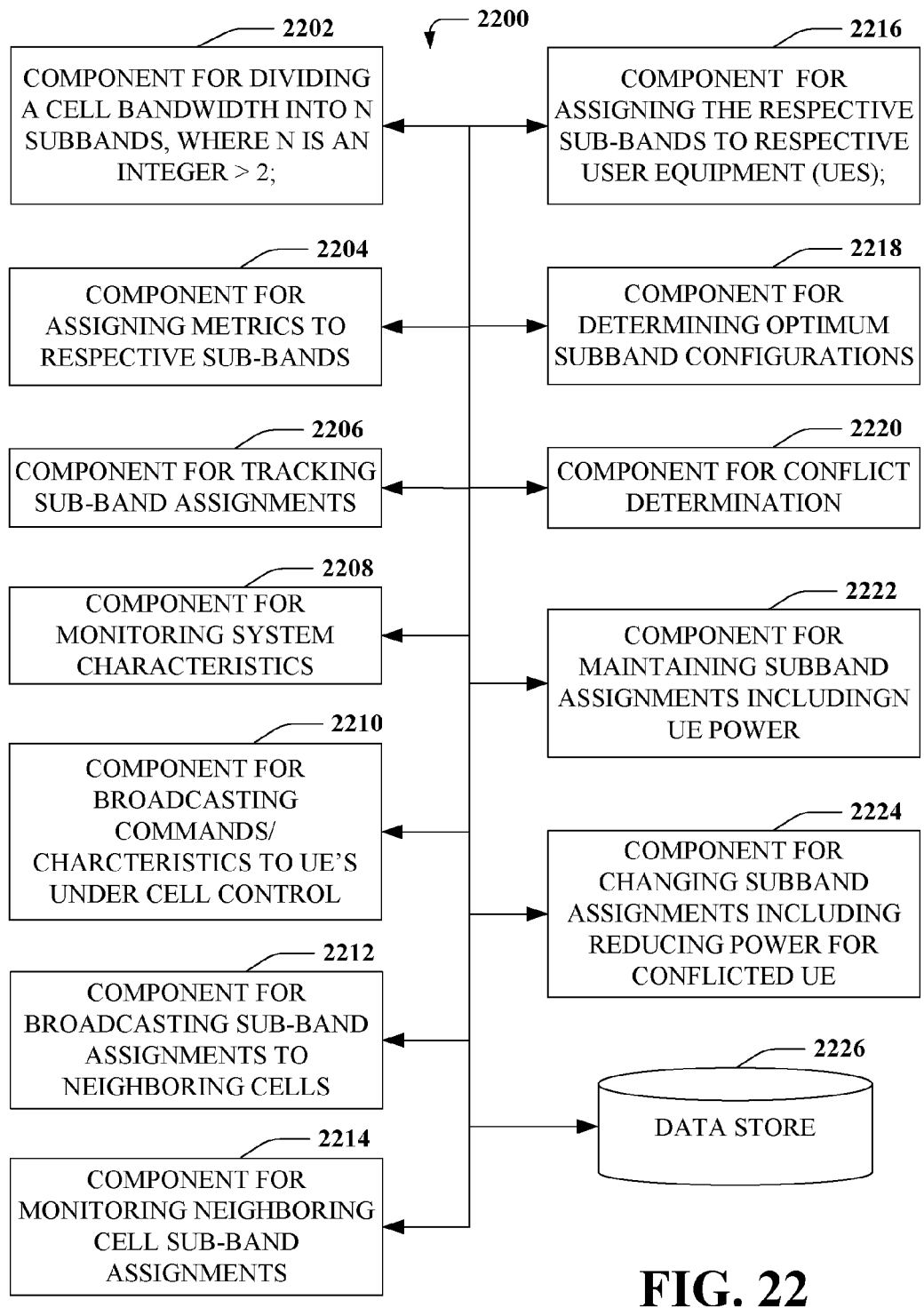
FIG. 22 is a system diagram illustrating a system that facilitates cell resource management and mitigating inter-cell interference.

FIG. 22 illustrates a system 2200 that facilitates cell resource management by permitting different and flexible cell metric operation levels for different sub-bands. System 2200 also facilitates mitigating inter-cell interference.

Component 2202 divides cell bandwidth into N sub-bands (N being an integer >2). Component 2216 assigns respective sub-bands to respective user equipment (UE) and component 2204 assigns system metric characteristics to respective sub-bands. It is to be appreciated that a variety of assignment protocols can be employed in connection with making sub-band and system metric characteristic assignments. For example, respective sub-bands can be designated for particular purposes (e.g., data type, power level, distance, interference mitigation, load-balancing . . . ), and UEs can be respectively assigned to sub-bands as a function of affinity thereto. In another example, an optimization scheme utilized by component 2218 (e.g., employing artificial intelligence) can be employed in connection with assignments. Likewise, extrinsic information (e.g., environmental factors, preferences, QoS, customer preferences, customer ranking, historical information) can be employed. Information from various sources can be contained in data store 2226. In another example, assignment can be a function of load-balancing across a cell or a plurality of cells.

Component 2206 tracks sub-band assignments, and component 2212 broadcasts sub-band assignments to neighboring cells (e.g., to apprise base stations or UEs in such neighboring cells of sub-band assignments) while component 2210 broadcasts commands and characteristics to UE's under the serving cell's control. Component 2214 monitors neighboring cell sub-band assignments, while component 2208 monitors the system characteristics. Component 2220 determines if a conflict exists as a function of such monitoring, and if it is determined that a conflict exists with respect to sub-band assignments component 2226 sends control information to particular UEs to reduce power in connection with mitigating inter-cell interference due to the conflict, for example. Component 2226 can also change sub-band assignments for other system operational control characteristics. If no conflict exists, component 2222 send control information to the UEs to maintain power level. Component 2222 also maintains other system characteristic data associated with sub-bands.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating cell resource management, comprising:
dividing a communications bandwidth of a cell into a plurality of sub-bands;
grouping the sub-bands into a plurality of groups of sub-bands where the sub-bands in each of the groups comprise sub-bands with same or similar operational characteristics, wherein at least two of the plurality of groups are associated with uplink load metrics that are different from one another, and wherein the uplink load metric comprises at least one of interference over thermal (IoT) and rise over thermal (RoT) and each of the plurality of groups is assignable to a plurality of devices; and
controlling power load conditions in the cell by permitting different uplink load metric operations for different sub-band groups in the plurality of groups of sub-bands.

2. The method of claim 1, further comprising varying transmission of a control command as a function of bits allocated for control.

3. The method of claim 2, wherein varying transmission is according to at least one of an index of user equipments (UE) in the cell, the sub-bands in the cell or a fractional frequency reuse factor.

4. The method of claim 1, wherein the uplink load metric operations are in a frequency domain.

5. The method of claim 1, wherein the uplink load metric operations are in a time domain.

6. The method of claim 1, wherein the uplink load metric operations are in combination of a frequency domain and a time domain.

7. The method of claim 1, further comprising transmitting one sub-band group load control of a sub-band group in the plurality of groups of sub-bands over air at a time and cycling through the entire plurality of groups of sub-bands over time.

8. The method of claim 1, wherein the permitting uplink load metric operations allows different characteristics for control and data traffic over the different sub-band groups.

9. An apparatus that facilitates cell resource management, comprising:
means for dividing a communications bandwidth of a cell into a plurality of sub-bands;

means for grouping the sub-bands into a plurality of groups of sub-bands where the sub-bands in each of the plurality of groups comprise sub-bands with same or similar operational characteristics, wherein at least two of plurality of groups are associated with uplink load metrics that are different from one another, and wherein the uplink load metric comprises at least one of interference over thermal (IoT) and rise over thermal (RoT) and each of the plurality of groups is assignable to a plurality of devices; and means for permitting different uplink load metric operations for different sub-band groups in the plurality of groups of sub-bands.

10. The apparatus of claim 9, further comprising means for varying transmission of a control command as a function of bits allocated for control.

11. The apparatus of claim 10, wherein varying transmission is according to at least one of an index of user equipments (UE) in the cell, the sub-bands in the cell or a fractional frequency reuse factor.

12. The apparatus of claim 9, wherein the uplink load metric operations are in a frequency domain.

13. The apparatus of claim 9, wherein the uplink load metric operations are in a time domain.

14. The apparatus of claim 9, wherein the uplink load metric operations are in combination of a frequency domain and a time domain.

15. The apparatus of claim 9, further means for comprising transmitting one sub-band group load control of a sub-band group in the plurality of groups of sub-bands over air at a time and cycling through the entire plurality of groups of sub-bands over time.

16. The apparatus of claim 9, wherein the means for permitting permits uplink load metric operations such that the different sub-band groups exploit different characteristics for control and data traffic.

17. A computer program product, comprising: a non-transitory computer-readable medium comprising code for:
dividing a communications bandwidth of a cell into a plurality of sub-bands;
grouping the divided sub-bands into a plurality of groups of sub-bands where the sub-bands in each of the plurality of groups comprise sub-bands with same or similar operational characteristics, wherein at least two of plurality of groups are associated with uplink load metrics that are different from one another, and wherein the uplink load metric comprises at least one of interference over thermal (IoT) and rise over thermal (RoT) and each of the plurality of groups is assignable to a plurality of devices; and
permitting different uplink load metric operations for different sub-band groups in the plurality of groups of sub-bands.

18. An apparatus operable in a wireless communication system, comprising:
a processor, configured for:
dividing a communications bandwidth of a cell into a plurality of sub-bands;
grouping the divided sub-bands into a plurality of groups of sub-bands where the sub-bands in each of the groups comprise sub-bands with same or similar operational characteristics, wherein at least two of plurality of groups are associated with uplink load metrics that are different from one another, and wherein the uplink load metric comprises at least one of interference over thermal (IoT) and rise over thermal (RoT) and each of the plurality of groups is assignable to a plurality of devices; and
permitting different uplink load metric operations for different sub-band groups in the plurality of groups of sub-bands; and
a memory coupled to the processor for storing data.

19. A method that facilitates inter-cell interference mitigation, comprising:
dividing a cell bandwidth into N sub-bands, where N is an integer greater than two; assigning a portion of the N sub-bands to respective user equipments (UE);
tracking sub-band assignments corresponding to the assigning of the portion of the N sub-bands to the respective UEs; and
broadcasting the sub-band assignments to one or more of an access node of a neighboring cell and a UE connected in a neighboring cell.

20. The method of claim 19, further comprising monitoring neighboring cell sub-band assignments.

21. The method of claim 20, further comprising determining whether a sub-band assignment conflict exists between at least one of the sub-band assignments and the neighboring cell sub-band assignments.

22. The method of claim 21, further comprising sending control information to at least one UE to reduce power, wherein the determining comprises determining that the sub-band assignment conflict exists.

23. The method of claim 21, further comprising sending control information to at least one UE to maintain power, wherein the determining comprises determining that the sub-band assignment conflict does not exist.

24. The method of claim 19, further comprising providing a binary valued load indicator data over a backhaul.

25. The method of claim 19, wherein the assigning the portion of the N sub-bands is based in part on channel conditions of the respective UEs.

26. An apparatus that facilitates inter-cell interference mitigation, comprising:
means for dividing a cell bandwidth into N sub-bands, where N is an integer greater than two;
means for assigning a portion of the N sub-bands to respective user equipments (UE);
means for tracking sub-band assignments corresponding to the assigning of the portion of the N sub-bands to the respective UEs; and
means for broadcasting the sub-band assignments to one or more of an access node of a neighboring cell and a UE connected in a neighboring cell.

27. The apparatus of claim 26, further comprising monitoring neighboring cell sub-band assignments.

28. The apparatus of claim 27, further comprising means for determining whether a sub-band assignment conflict exists between at least one of the sub-band assignments and the neighboring cell sub-band assignments.

29. The apparatus of claim 28, further comprising means for sending control information to at least one UE to reduce power, wherein the means for determining determines that the sub-band assignment conflict exists.

30. The apparatus of claim 28, further comprising means for sending control information to at least one UE to maintain power, wherein the means for determining determines that the sub-band assignment conflict does not exist.

31. The apparatus of claim 26, further comprising means for providing a binary valued load indicator data over a backhaul.

32. The apparatus of claim 26, wherein the means for assigning assigns the portion of the N sub-bands based in part on channel conditions of the respective UEs.

33. A computer program product, comprising:
- a non-transitory computer-readable medium comprising code for:
  - dividing a cell bandwidth into N sub-bands, where N is an integer greater than two;
  - assigning a portion of the N sub-bands to respective user equipments (UE);
  - tracking sub-band assignments corresponding to the assigning of the portion of the N sub-bands to the respective UEs; and
  - broadcasting the sub-band assignments to one or more of an access node of a neighboring cell and a UE connected in a neighboring cell.

34. An apparatus that facilitates inter-cell interference mitigation, comprising:
- a processor, configured for:
  - dividing a cell bandwidth into N sub-bands, where N is an integer greater than two;
  - assigning a portion of the N sub-bands to respective user equipments (UE); tracking sub-band assignments corresponding to the assigning of the portion of the N sub-bands to the respective UEs; and
  - broadcasting the sub-band assignments to one or more of an access node of a neighboring cell and a UE connected in a neighboring cell; and
- a memory coupled to the processor for storing data.

* * * * *